US011962851B2

(12) United States Patent
Woodruff et al.

(10) Patent No.: US 11,962,851 B2
(45) Date of Patent: *Apr. 16, 2024

(54) METHODS AND APPARATUS TO DETERMINE AN AUDIENCE COMPOSITION BASED ON THERMAL IMAGING AND FACIAL RECOGNITION

(71) Applicant: The Nielsen Company (US), LLC, New York, NY (US)

(72) Inventors: Stanley Wellington Woodruff, Palm Harbor, FL (US); John T. LiVoti, Clearwater, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/091,538

(22) Filed: Dec. 30, 2022

(65) Prior Publication Data
US 2023/0134393 A1 May 4, 2023

Related U.S. Application Data

(63) Continuation of application No. 16/998,817, filed on Aug. 20, 2020, now Pat. No. 11,553,247.

(51) Int. Cl.
*H04N 21/44* (2011.01)
*G06V 40/16* (2022.01)
(Continued)

(52) U.S. Cl.
CPC ..... *H04N 21/44218* (2013.01); *G06V 40/166* (2022.01); *G06V 40/171* (2022.01); *H04N 5/33* (2013.01); *H04N 21/4223* (2013.01)

(58) Field of Classification Search
CPC ......... H04N 21/44218; H04N 21/4223; H04N 21/25866; H04N 21/42201;
(Continued)

(56) References Cited

U.S. PATENT DOCUMENTS 4,769,697 A * 9/1988 Gilley .................... H04H 60/46
725/12
5,481,294 A 1/1996 Thomas et al.
(Continued)

FOREIGN PATENT DOCUMENTS

EP 358911 A2 3/1990
JP 3328500 B2 9/2002
(Continued)

OTHER PUBLICATIONS

Cooper, "How secure is voice recognition technology?" [http://www.business.att.com], retrieved Jul. 14, 2020, 5 pages.
(Continued)

*Primary Examiner* — Timothy R Newlin

(57) ABSTRACT

Methods, apparatus, systems and articles of manufacture are disclosed. An example apparatus includes a thermal image detector to determine a heat blob count based on a frame of thermal image data captured in the media environment, an audience image detector to identify a face of an audience member based on a frame of audience image data captured in the media environment, the frame of audience image data corresponding to a field of view associated with at least one heat blob included in the heat blob count, and a people meter controller to cause a people meter, which is to emit a prompt for audience identification information, not to emit the prompt for at least a first time period after the audience member is identified.

20 Claims, 10 Drawing Sheets

(51) Int. Cl.
  *H04N 5/33* (2023.01)
  *H04N 21/4223* (2011.01)
  *H04N 21/442* (2011.01)

(58) Field of Classification Search
  CPC ......... H04N 21/42203; H04N 21/4394; H04N 21/44008; H04N 21/6582; H04N 5/33; G06V 40/166; G06V 40/171; G06V 40/161; G06V 10/255; G06V 10/44; G06V 10/50; G06V 10/56; G06V 10/74; G06V 20/52; H04H 60/45
  See application file for complete search history.

(56) References Cited

U.S. PATENT DOCUMENTS

| | | | |
|---|---|---|---|
| 5,995,206 A | 11/1999 | Morinaka et al. | |
| 6,029,124 A | 2/2000 | Gillick et al. | |
| 6,571,865 B1 | 6/2003 | Shi et al. | |
| 6,849,199 B2 | 2/2005 | Vickers, Jr. et al. | |
| 7,155,159 B1 | 12/2006 | Weinblatt et al. | |
| 7,609,853 B2 * | 10/2009 | Ramaswamy | H04N 7/17309 382/168 |
| 7,752,042 B2 * | 7/2010 | Srinivasan | G10L 15/20 704/226 |
| 7,839,291 B1 | 11/2010 | Richards | |
| 7,985,953 B2 * | 7/2011 | Luterotti | G08B 13/19 250/353 |
| 8,091,100 B2 | 1/2012 | Donato | |
| 8,571,865 B1 * | 10/2013 | Hewinson | G10L 17/06 704/270 |
| 8,849,199 B2 * | 9/2014 | Shrum, Jr. | H04N 21/44218 704/231 |
| 9,100,132 B2 | 8/2015 | Kolessar et al. | |
| 9,100,685 B2 * | 8/2015 | Conrad | H04N 21/4223 |
| 9,183,849 B2 | 11/2015 | Neuhauser et al. | |
| 9,219,559 B2 | 12/2015 | McMillan | |
| 9,363,155 B1 | 6/2016 | Gravino et al. | |
| 9,489,640 B2 | 11/2016 | Neuhauser et al. | |
| 9,489,646 B2 | 11/2016 | Puttabasappa et al. | |
| 9,503,536 B2 * | 11/2016 | Bosworth | G06F 11/34 |
| 9,628,844 B2 | 4/2017 | Conrad et al. | |
| 9,667,920 B2 | 5/2017 | Deng | |
| 9,711,034 B2 | 7/2017 | Daniel | |
| 9,918,127 B2 * | 3/2018 | Hicks | G06V 40/161 |
| 10,032,451 B1 | 7/2018 | Mamkina et al. | |
| 10,657,383 B1 * | 5/2020 | Solh | G07C 9/00182 |
| 10,860,645 B2 | 12/2020 | Oh | |
| 11,151,858 B2 | 10/2021 | Modiano | |
| 11,176,940 B1 | 11/2021 | Zhong et al. | |
| 11,373,425 B2 | 6/2022 | Livoti et al. | |
| 11,553,247 B2 | 1/2023 | Woodruff et al. | |
| 11,595,723 B2 | 2/2023 | LiVoti et al. | |
| 2002/0052746 A1 | 5/2002 | Handelman | |
| 2002/0198762 A1 | 12/2002 | Donato | |
| 2003/0012425 A1 * | 1/2003 | Suzuki | G02B 27/0093 348/E13.05 |
| 2004/0059438 A1 * | 3/2004 | Sherlock | G08B 25/008 700/12 |
| 2005/0044189 A1 | 2/2005 | Ikezoye et al. | |
| 2006/0062429 A1 | 3/2006 | Ramaswamy et al. | |
| 2007/0011040 A1 | 1/2007 | Wright et al. | |
| 2008/0159591 A1 | 7/2008 | Ruedin | |
| 2009/0002144 A1 | 1/2009 | Bernard et al. | |
| 2009/0290756 A1 | 11/2009 | Ramaswamy et al. | |
| 2010/0162285 A1 * | 6/2010 | Cohen | H04N 21/262 725/12 |
| 2010/0195865 A1 | 8/2010 | Luff | |
| 2011/0004474 A1 | 1/2011 | Bansal et al. | |
| 2011/0215932 A1 * | 9/2011 | Daniel | G08B 21/22 340/573.1 |
| 2012/0023976 A1 * | 2/2012 | Kim | F24F 11/30 62/89 |
| 2012/0191231 A1 | 7/2012 | Wang | |
| 2013/0016203 A1 * | 1/2013 | Saylor | G06V 40/19 348/78 |
| 2013/0132271 A1 * | 5/2013 | Daniel | G06F 21/10 726/26 |
| 2014/0056433 A1 | 2/2014 | Emerson, III | |
| 2014/0280127 A1 | 9/2014 | Wang et al. | |
| 2014/0309866 A1 * | 10/2014 | Ricci | G06F 21/32 701/36 |
| 2015/0092019 A1 * | 4/2015 | Asano | H04N 23/74 348/136 |
| 2015/0189378 A1 | 7/2015 | Soundararajan et al. | |
| 2015/0199008 A1 * | 7/2015 | Kim | G06F 3/013 345/156 |
| 2015/0334457 A1 | 11/2015 | Chandel et al. | |
| 2016/0065902 A1 * | 3/2016 | Deng | H04H 60/31 348/77 |
| 2016/0066034 A1 * | 3/2016 | Hicks | H04N 21/4223 725/12 |
| 2016/0162674 A1 | 6/2016 | Friedman | |
| 2016/0234034 A1 | 8/2016 | Mahar et al. | |
| 2016/0261911 A1 | 9/2016 | Soundararajan et al. | |
| 2016/0344856 A1 | 11/2016 | Alameh et al. | |
| 2017/0024591 A1 | 1/2017 | Detter et al. | |
| 2017/0078749 A1 | 3/2017 | PangZe | |
| 2017/0147885 A1 * | 5/2017 | Aggarwal | G06N 5/04 |
| 2017/0178681 A1 | 6/2017 | Keal et al. | |
| 2017/0201795 A1 | 7/2017 | Hicks | |
| 2018/0137740 A1 | 5/2018 | Vitt et al. | |
| 2018/0157902 A1 | 6/2018 | Tu et al. | |
| 2018/0240251 A1 * | 8/2018 | Kitagawa | H04N 23/73 |
| 2018/0242907 A1 | 8/2018 | Bonomi | |
| 2018/0253221 A1 * | 9/2018 | Cho | G06F 3/0482 |
| 2018/0286068 A1 | 10/2018 | Matsubara et al. | |
| 2018/0295420 A1 * | 10/2018 | Rumreich | H04N 21/4532 |
| 2018/0356968 A1 | 12/2018 | Vitt et al. | |
| 2018/0365968 A1 | 12/2018 | Vitt et al. | |
| 2019/0098359 A1 | 3/2019 | Hicks | |
| 2019/0116272 A1 | 4/2019 | Freeman | |
| 2019/0130365 A1 | 5/2019 | Pell et al. | |
| 2019/0268575 A1 * | 8/2019 | Leow | H04N 23/45 |
| 2019/0320214 A1 | 10/2019 | Sullivan et al. | |
| 2019/0330214 A1 | 10/2019 | Miyazaki et al. | |
| 2019/0332871 A1 | 10/2019 | Sudarsan et al. | |
| 2019/0377898 A1 | 12/2019 | Dunjic et al. | |
| 2019/0378519 A1 | 12/2019 | Dunjic et al. | |
| 2020/0067620 A1 | 2/2020 | Carmichael | |
| 2020/0112759 A1 * | 4/2020 | Alameh | H04N 21/42202 |
| 2020/0193592 A1 | 6/2020 | Arienzo et al. | |
| 2020/0334472 A1 | 10/2020 | Miyano | |
| 2020/0349230 A1 | 11/2020 | Yoshioka et al. | |
| 2021/0042859 A1 | 2/2021 | Iwai | |
| 2021/0073528 A1 | 3/2021 | Lagerman | |
| 2021/0082127 A1 | 3/2021 | Yano et al. | |
| 2021/0082382 A1 | 3/2021 | Pinhas | |
| 2021/0195045 A1 * | 6/2021 | Kim | H04N 5/33 |
| 2021/0216753 A1 | 7/2021 | Gefen et al. | |
| 2021/0374394 A1 | 12/2021 | Livoti et al. | |
| 2021/0397852 A1 * | 12/2021 | Tabor | H04N 5/33 |
| 2022/0058382 A1 | 2/2022 | Livoti et al. | |
| 2022/0060784 A1 | 2/2022 | LiVoti et al. | |
| 2022/0060785 A1 | 2/2022 | Woodruff et al. | |
| 2022/0103022 A1 * | 3/2022 | Bell | H02J 50/20 |
| 2022/0327853 A1 | 10/2022 | LiVoti et al. | |

FOREIGN PATENT DOCUMENTS

| | | |
|---|---|---|
| NZ | 530015 A | 8/2005 |
| WO | 2021247706 A1 | 12/2021 |

OTHER PUBLICATIONS

Wikipedia, "Speaker Recognition," [https://en.wikipedia.org/wiki/Speaker_recognition], retrieved Jul. 14, 2020, last edited Feb. 21, 2020, 6 pages.

"What's the Difference between Thermal Imaging and Night Vision," Flir.com, 7 pages. Retrieved May 21, 2019, from https://www.flir.com/discover/ots/thermal-vs-night-vision/.

(56) References Cited

OTHER PUBLICATIONS

United States Patent and Trademark Office, "Non-Final Office Action," in connection with U.S. Appl. No. 16/890,715, dated Feb. 22, 2021, 9 pages.
United States Patent and Trademark Office, "Final Office Action," in connection with U.S. Appl. No. 16/890,715, dated Jul. 23, 2021, 11 pages.
United States Patent and Trademark Office, "Non-Final Office Action," in connection with U.S. Appl. No. 16/998,811, dated Dec. 22, 2021, 12 pages.
United States Patent and Trademark Office, "Notice of Allowance and Fee(s) Due," in connection with U.S. Appl. No. 16/890,715, dated Feb. 4, 2022, 8 pages.
United States Patent and Trademark Office, "Non-Final Office Action," in connection with U.S. Appl. No. 16/998,814, dated Mar. 15, 2022, 8 pages.
International Searching Authority, "Written Opinion," in connection with International Patent Application No. PCT/US2021/035449, dated Oct. 5, 2021, 4 pages.
International Searching Authority, "Search Report," in connection with International Patent Application No. PCT/US2021/035449, dated Oct. 5, 2021, 4 pages.
United States Patent and Trademark Office, "Notice of Allowance and Fee(s) Due," in connection with U.S. Appl. No. 16/890,715, dated May 23, 2022, 8 pages.
United States Patent and Trademark Office, "Corrected Notice of Allowability," in connection with U.S. Appl. No. 16/890,715, dated Jun. 2, 2022, 2 pages.
United States Patent and Trademark Office, "Final Office Action," in connection with U.S. Appl. No. 16/998,811, dated Jun. 1, 2022, 17 pages.
United States Patent and Trademark Office, "Final Office Action," in connection with U.S. Appl. No. 16/998,814, dated Aug. 1, 2022, 11 pages.
United States Patent and Trademark Office, "Notice of Allowance and Fee(s) Due," in connection with U.S. Appl. No. 16/998,811, dated Aug. 16, 2022, 9 pages.
United States Patent and Trademark Office, "Advisory Action," in connection with U.S. Appl. No. 16/998,814, dated Oct. 25, 2022, 2 pages.
United States Patent and Trademark Office, "Notice of Allowance and Fee(s) Due," in connection with U.S. Appl. No. 16/998,811, dated Nov. 22, 2022, 9 pages.
United States Patent and Trademark Office, "Non-Final Rejection," in connection with U.S. Appl. No. 16/998,817, dated Jul. 21, 2021, 6 pages.
United States Patent and Trademark Office, "Final Rejection," in connection with U.S. Appl. No. 16/998,817, dated Nov. 5, 2021, 7 pages.
United States Patent and Trademark Office, "Non-Final Rejection," in connection with U.S. Appl. No. 16/998,817, dated Mar. 24, 2022, 7 pages.
United States Patent and Trademark Office, "Notice of Allowance and Fee(s) Due," in connection with U.S. Appl. No. 16/998,817, dated Aug. 31, 2022, 8 pages.
United States Patent and Trademark Office, "Corrected Notice of Allowability," in connection with U.S. Appl. No. 16/998,817, dated Dec. 8, 2022, 3 pages.
United States Patent and Trademark Office, "Corrected Notice of Allowability," in connection with U.S. Appl. No. 16/998,817, dated Dec. 15, 2022, 3 pages.
United States Patent and Trademark Office, "Non-Final Office Action," in connection with U.S. Appl. No. 16/998,814, dated Dec. 15, 2022, 5 pages.
United States Patent and Trademark Office, "Notice of Allowance and Fee(s) Due," in connection with U.S. Appl. No. 16/998,811, dated Jan. 19, 2023, 3 pages.
Patent Cooperation Treaty, "International Preliminary Report on Patentability," issued in connection with International Patent Application No. PCT/US2021/035449, dated Dec. 15, 2022, 6 pages.
United States Patent and Trademark Office, "Non-Final Rejection," in connection with U.S. Appl. No. 17/850,726, dated Apr. 6, 2023, 8 pages.
United States Patent and Trademark Office, "Notice of Allowance and Fee(s) Due," issued in connection with U.S. Appl. No. 16/998,814, dated May 3, 2023, 7 pages.

* cited by examiner

METHODS AND APPARATUS TO DETERMINE AN AUDIENCE COMPOSITION BASED ON THERMAL IMAGING AND FACIAL RECOGNITION

RELATED APPLICATIONS

This patent arises from a continuation of U.S. patent application Ser. No. 16/998,817, which was filed on Aug. 20, 2020, and which is now issued as U.S. Pat. No. 11,553,247. U.S. patent application Ser. No. 16/998,817 is hereby incorporated herein by reference in its entirety. Priority to U.S. patent application Ser. No. 16/998,817 is hereby claimed.

FIELD OF THE DISCLOSURE

This disclosure relates generally to audience monitoring, and, more particularly, to methods and apparatus to determine an audience composition based on thermal imaging and facial recognition.

BACKGROUND

Media monitoring companies, also referred to as audience measurement entities, monitor user interaction with media devices, such as smartphones, tablets, laptops, smart televisions, etc. To facilitate such monitoring, monitoring companies enlist panelists and install meters at the media presentation locations of those panelists. The meters monitor media presentations and transmit media monitoring information to a central facility of the monitoring company. Such media monitoring information enables the media monitoring companies to, among other things, monitor exposure to advertisements, determine advertisement effectiveness, determine user behavior, identify purchasing behavior associated with various demographics, etc.

BRIEF DESCRIPTION OF THE DRAWINGS

The figures are not to scale. In general, the same reference numbers will be used throughout the drawing(s) and accompanying written description to refer to the same or like parts.

Figure 1:
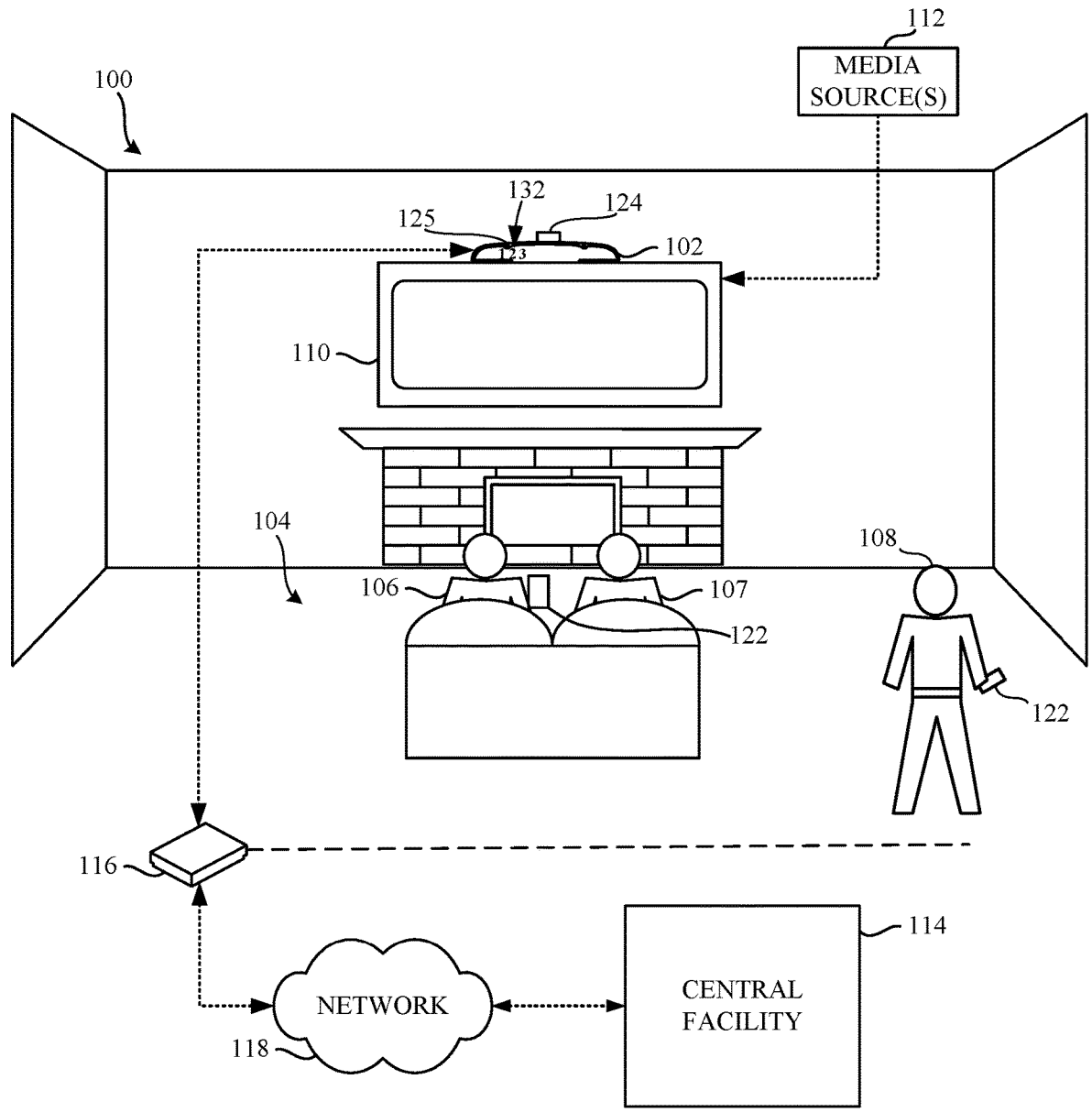
FIG. 1 illustrates an example audience measurement system having an example meter to monitor an example media presentation environment and generate exposure data for monitored media.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

At least some meters that perform media monitoring, such as the meters described above, implement media identification features and people identification features. Such features (e.g., media identification and people identification) enable the generation of media monitoring information that can be used for determining audience exposure (also referred to as user exposure) to advertisements, determining advertisement effectiveness, determining user behavior relative to media, identifying the purchasing behavior associated with various demographics, etc. The people identification features of the meter determine the audience in a media presentation environment. For example, the people identification feature may be implemented by active people meters, passive people meters, and/or a combination of active people meters and passive people meters to determine a people count.

An active people meter obtains a people count by actively prompting an audience to enter information for audience member identification. In some examples, an active people meter identifies an audience member by the audience member's assigned panelist number or visitor number. For example, the active people meter obtains the assigned panelist number or visitor number through a communication channel. In some examples, the active people meter pairs the information corresponding to the audience input with a household (e.g., a specific media environment) and with the corresponding demographic data for the people of that household. In some examples, the active people meter validates viewership (e.g., the number of audience members viewing media in the media environment) at a set interval. For example, the active people meter generates a prompting message for the audience members to verify that they are still in the audience. In this manner, the active people meter relies on audience compliance. In some examples, maintaining audience compliance is a challenge. For example, audience members may incorrectly enter the number of people viewing the media and/or they may miss the prompting messages generated by the active people meter.

A passive people meter obtains audience information passively, usually by capturing images of the audience using a camera and then employing facial recognition to identify the individual audience members included in the audience. In some examples, image processing for facial recognition can be processor intensive. Additionally, facial recognition algorithms can take a substantial amount of time to reliably recognize people in an image.

To enable an accurate and less invasive method of determining a people count, example methods and apparatus disclosed herein utilize a combination of a passive people meter and an active people meter. An example passive people meter disclosed herein includes an example thermal imaging system and an example facial recognition system to identify audience members in the media environment. In some examples, the thermal imaging system includes a thermal imaging sensor (e.g., a thermal imaging camera) to scan the media environment and capture frames of thermal image data of the media environment. In some examples, the facial recognition system includes a light imaging sensor (e.g., a light imaging camera) to capture frames of audience image data that depict the audience members sensed in the thermal image data. The example passive people meter utilizes the frames of thermal image data and/or audience image data to detect and identify audience members in the media environment.

Example methods and apparatus disclosed herein additionally utilize the active people meter to identify audience members in the media environment. An example people meter, implemented by the example active people meter and the example passive people meter as disclosed herein, includes an audience image detector to identify audience members. In some examples, when the audience image detector is unable to identify one or more audience members, the audience image detector can notify the active people meter to generate a new prompting message for the audience member.

In some examples, the example people meter reduces (e.g., minimizes) the amount of prompting generated by the active people meter relative to prior people meters that do not employ a combination of active and passive people metering. For example, when the comparator determines a heat blob count represented by the thermal image data has not changed, the audience count is verified, and subsequent active prompting can be disabled for at least a given monitoring interval (e.g., 5 minutes, 15 minutes, etc.). Using thermal imaging, the people meter monitors the media environment over time (e.g., continuously, at sampled time intervals, etc.) to determine the number of human size heat blobs present, validate the number of heat blobs against the number entered on the active people meter, and accurately measure the audience. Additionally or alternatively, when the image detector identifies the audience members of the media environment, the audience composition is verified, and subsequent active prompting can be disabled for at least a given monitoring interval. As used herein, the "audience composition" refers to the number and/or identities of audience members in the audience.

In some examples disclosed herein, the example people meter includes a people identification model controller to train a model to learn about the corresponding household media environment. As used herein, a model is a description of an environment using mathematical concepts and language. A model is generally composed of relationships and variables, the relationships describing operators (e.g., such as algebraic operators, functions, etc.) and the variables describing monitored environment parameters of interest that can be quantified. In some examples, the model is a machine learning and/or artificial intelligence (AI) model such as a Linear Regression model, a decision tree, a support vector machine (SVM) model, a Naïve Bayes model, etc.

In some examples, the people identification model controller obtains data from the comparator, the active people meter, and the passive people meter and generates a feature vector corresponding to the data. The example people identification model controller utilizes the feature vector to train the model. For example, the feature vector includes data representative of descriptive characteristics of a physical environment (e.g., the household media environment). In some examples, such data includes a date and time, a number of audience members present in the media environment, a media source (e.g., radio media, television media, pay per view media, movies, Internet Protocol Television (IPTV), satellite television (TV), Internet radio, satellite radio, digital television), a media channel (e.g., broadcast channel, a domain name), and the demographics of the audience members. In this manner, the example people identification model controller can generate the model to learn who will be in the audience and at what time. Eventually, when training is complete, the model can be deployed at the meter and utilized to make informed decisions about the audience composition.

In some examples, the model can utilize the presence of people determined by the thermal imaging camera as a metric to determine whether the people meter is actually counting the right number of people. Additionally or alternatively, the model can utilize the identification of audience members determined by the light imaging camera as a metric to determine whether the people meter is actually crediting the media exposure to the correct panelists. For example, the model could be used to determine if the audience views the same or similar media every Tuesday night at 8:00 pm, if there usually two particular people present in the media audience, etc. In such an example, the model is used to verify the accuracy of the people count and/or audience composition based on the information obtained.

FIG. 1 is an illustration of an example audience measurement system 100 having an example meter 102 to monitor an example media presentation environment 104. In the illustrated example of FIG. 1, the media presentation environment 104 includes panelists 106, 107, and 108, an example media device 110 that receives media from an example media source 112, and the meter 102. The meter 102 identifies the media presented by the media device 110 and reports media monitoring information to an example central facility 114 of an audience measurement entity via an example gateway 116 and an example network 118. The example meter 102 of FIG. 1 sends media monitoring data and/or audience monitoring data to the central facility 114 periodically, a-periodically and/or upon request by the central facility 114.

In the illustrated example of FIG. 1, the media presentation environment 104 is a room of a household (e.g., a room in a home of a panelist, such as the home of a "Nielsen family") that has been statistically selected to develop media (e.g., television) ratings data for a population/demographic of interest. In the illustrated example of FIG. 1, the example panelists 106, 107, and 108 of the household have been statistically selected to develop media ratings data (e.g., television ratings data) for a population/demographic of interest. People become panelists via, for example, a user interface presented on a media device (e.g., via the media device 110, via a website, etc.). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example, one or more panelists 106, 107, and 108 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 104 is a household, the example media presentation environment 104 can additionally or alternatively be any other type(s) of environments such as, for example, a theater, a restaurant, a tavern, a retail location, an arena, etc.

In the illustrated example of FIG. 1, the example media device 110 is a television. However, the example media device 110 can correspond to any type of audio, video, and/or multimedia presentation device capable of presenting media audibly and/or visually. In some examples, the media device 110 (e.g., a television) may communicate audio to another media presentation device (e.g., an audio/video receiver) for output by one or more speakers (e.g., surround sound speakers, a sound bar, etc.). As another example, the media device 110 can correspond to a multimedia computer system, a personal digital assistant, a cellular/mobile smartphone, a radio, a home theater system, stored audio and/or video played back from a memory such as a digital video recorder or a digital versatile disc, a webpage, and/or any other communication device capable of presenting media to an audience (e.g., the panelists 106, 107, and 108).

The media source 112 may be any type of media provider(s), such as, but not limited to, a cable media service provider, a radio frequency (RF) media provider, an Internet based provider (e.g., IPTV), a satellite media service provider, etc. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc.

The example media device 110 of the illustrated example shown in FIG. 1 is a device that receives media from the media source 112 for presentation. In some examples, the media device 110 is capable of directly presenting media (e.g., via a display) while, in other examples, the media device 110 presents the media on separate media presentation equipment (e.g., speakers, a display, etc.). Thus, as used herein, "media devices" may or may not be able to present media without assistance from a second device. Media devices are typically consumer electronics. For example, the media device 110 of the illustrated example could be a personal computer such as a laptop computer, and, thus, capable of directly presenting media (e.g., via an integrated and/or connected display and speakers). In some examples, the media device 110 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source 112, etc., is also typically included in the media. While a television is shown in the illustrated example, any other type(s) and/or number(s) of media device(s) may additionally or alternatively be used. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. may additionally or alternatively be used.

The example meter 102 detects exposure to media and electronically stores monitoring information (e.g., a code/watermark detected with the presented media, a signature of the presented media, an identifier of a panelist present at the time of the presentation, a timestamp of the time of the presentation) of the presented media. The stored monitoring information is then transmitted back to the central facility 114 via the gateway 116 and the network 118. While the media monitoring information is transmitted by electronic transmission in the illustrated example of FIG. 1, the media monitoring information may additionally or alternatively be transferred in any other manner, such as, for example, by physically mailing the meter 102, by physically mailing a memory of the meter 102, etc.

The meter 102 of the illustrated example of FIG. 1 combines media measurement data and people metering data. For example, media measurement data is determined by monitoring media output by the media device 110 and/or other media presentation device(s), and people metering data (also referred to as demographic data, people monitoring data, etc.) is determined by monitoring people with the meter 102. Thus, the example meter 102 provides dual functionality of a media meter to collect content media measurement data and people meter to collect and/or associate demographic information corresponding to the collected media measurement data.

For example, the meter 102 of the illustrated example collects media identifying information and/or data (e.g., signature(s), fingerprint(s), code(s), tuned channel identification information, time of exposure information, etc.) and people data (e.g., user identifiers, demographic data associated with audience members, etc.). The media identifying information and the people data can be combined to generate, for example, media exposure data (e.g., ratings data) indicative of amount(s) and/or type(s) of people that were exposed to specific piece(s) of media distributed via the media device 110. To extract media identification data, the meter 102 and/or the example audience measurement system 100 extracts and/or processes the collected media identifying information and/or data received by the meter 102, which can be compared to reference data to perform source and/or content identification. Any other type(s) and/or number of media monitoring techniques can be supported by the meter 102.

Depending on the type(s) of metering the meter 102 is to perform, the meter 102 can be physically coupled to the media device 110 or may be configured to capture signals emitted externally by the media device 110 (e.g., free field audio) such that direct physical coupling to the media device 110 is not required. For example, the meter 102 of the illustrated example may employ non-invasive monitoring not involving any physical connection to the media device 110 (e.g., via Bluetooth® connection, WIFI® connection, acoustic watermarking, etc.) and/or invasive monitoring involving one or more physical connections to the media device 110 (e.g., via USB connection, a High Definition Media Interface (HDMI) connection, an Ethernet cable connection, etc.).

In examples disclosed herein, to monitor media presented by the media device 110, the meter 102 of the illustrated example employs audio watermarking techniques and/or signature based-metering techniques. Audio watermarking is a technique used to identify media, such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component of the media. In some examples, the audio or video component is selected to have a signal characteristic sufficient to hide the watermark. As used herein, the terms "code" and "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

For example, the meter 102 of the illustrated example senses audio (e.g., acoustic signals or ambient audio) output (e.g., emitted) by the media device 110. For example, the meter 102 processes the signals obtained from the media device 110 to detect media and/or source identifying signals (e.g., audio watermarks) embedded in portion(s) (e.g., audio portions) of the media presented by the media device 110. To sense ambient audio output by the media device 110, the meter 102 of the illustrated example includes an acoustic sensor (e.g., a microphone). In some examples, the meter 102 may process audio signals obtained from the media device 110 via a direct cable connection to detect media and/or source identifying audio watermarks embedded in such audio signals. In some examples, the meter 102 may process audio signals and/or video signals to generate respective audio and/or video signatures from the media presented by the media device 110.

To generate exposure data for the media, identification(s) of media to which the audience is exposed are correlated with people data (e.g., presence information) collected by the meter 102. The meter 102 of the illustrated example collects inputs (e.g., audience monitoring data) representative of the identities of the audience member(s) (e.g., the panelists 106, 107, and 108). In some examples, the meter 102 collects audience monitoring data by periodically or a-periodically prompting audience members in the monitored media presentation environment 104 to identify themselves as present in the audience. In some examples, the meter 102 responds to events (e.g., when the media device 110 is turned on, a channel is changed, an infrared control signal is detected, etc.) by prompting the audience member(s) to self-identify.

In some examples, the meter 102 determines a people count by utilizing an example thermal imaging sensor 124. For example, the thermal imaging sensor 124 captures frames of thermal image data of the media presentation environment 104 and provides the thermal image data to the meter 102 to detect human sized blobs of heat. In some examples, the meter 102 responds to events (e.g., when the media device 110 is turned on, a channel is changed, an infrared control signal is detected, etc.) by prompting the thermal imaging sensor 124 to capture thermal images. Additionally or alternatively, the meter 102 can determine the audience composition (e.g., identify the panelists 106, 107, 108) by utilizing an example light imaging sensor 125. For example, the light imaging sensor 125 captures frames of audience image data of the media presentation environment 104 and provides the audience image data to the meter 102, which performs facial recognition and/or other image processing to identify the panelists 106, 107, 108 represented in the audience image data. In some examples, the meter 102 prompts the light imaging sensor 125 to capture images in response to changes in the number of human sized blobs of heat detected in the thermal image data.

The example thermal imaging sensor 124 utilizes heat energy of an environment (e.g., the media presentation environment 104) to generate thermal image data. The example thermal imaging sensor 124 records the temperature of various objects in the frame, and then assigns different shades of colors to corresponding different temperatures (e.g., to different ranges of temperatures). In some such examples, a particular shade of color indicates how much heat is radiating off an object compared to the other objects in the frame. For example, the thermal imaging sensor 124 includes measuring devices that capture infrared radiation (e.g., microbolometers) associated with each pixel in the frame. The measuring devices then record the temperature of the pixel and assign the pixel to an appropriate color. In some examples, the thermal imaging sensor 124 is configured to assign a greyscale to pixels in a frame, where white may be indicative of "hot" (e.g., the highest temperature in the frame) and dark grey/black may be indicative of "cold" (e.g., the lowest temperature in the frame). In some examples, the thermal imaging sensor 124 is configured to assign warm and cool colors (e.g., warm corresponding to red, orange, and yellow colors; cool corresponding to green, blue, and purple colors) to the pixels in a frame, where the warm colors may be indicative of relatively higher temperatures and the cool colors may be indicative of relatively lower temperatures. In some examples, a human radiates more heat (e.g., is associated with a higher temperature) than inanimate objects, such as a couch or remote control device.

The example light imaging sensor 125 captures audience image data from an environment (e.g., the media presentation environment 104). The example light imaging sensor 125 of the illustrated example of FIG. 1 is a camera. The example light imaging sensor 125 receives light waves, such as the light waves emitting from the example media device 110 and converts them into signals that convey information. Additionally or alternatively, the light imaging sensor 125 generates audience image data representing objects present within the field of view (FOV) of the light imaging sensor 125. In examples disclosed herein, the FOV of the light imaging sensor 125 is based on the thermal image data generated by the thermal imaging sensor 124. For example, the light imaging sensor 125 can control (or be controlled) to focus its FOV to correspond to locations in the thermal image frames that include audience members. For example, the meter 102 determines locations in the thermal image frames with warm colors (e.g., temperature of a human). In some examples, the thermal imaging sensor 124 collects frames of thermal data including temperatures indicative of the panelists 106 and 107. The example meter 102 controls the light imaging sensor 125 to capture frames of audience image data corresponding to the thermal image frames indicative of humans. Thus, the FOV of the light imaging sensor 125 includes the panelists 106 and 107 but not the panelist 108.

The audience monitoring data and the exposure data can then be compiled with the demographic data collected from audience members such as, for example, the panelists 106, 107, and 108 during registration to develop metrics reflecting, for example, the demographic composition of the audience. The demographic data includes, for example, age, gender, income level, educational level, marital status, geographic location, race, etc., of the panelist.

In some examples, the meter 102 may be configured to receive audience information via an example input device 122 such as, for example, a remote control, An Apple iPad®, a cell phone, etc. In such examples, the meter 102 prompts the audience members to indicate their presence by pressing an appropriate input key on the input device 122. For example, the input device 122 may enable the audience member(s) (e.g., the panelists 106, 107, and 108 of FIG. 1) and/or an unregistered user (e.g., a visitor to a panelist household) to input information to the meter 102 of FIG. 1. This information includes registration data to configure the meter 102 and/or demographic data to identify the audience member(s). For example, the input device 122 may include a gender input interface, an age input interface, and a panelist identification input interface, etc. Although FIG. 1 illustrates multiple input devices 122, the example media presentation environment 104 may include an input device 122 with multiple inputs for multiple panelists. For example, an input device 122 can be utilized as a household input device 122 where panelists of the household may each have a corresponding input assigned to them.

The example gateway 116 of the illustrated example of FIG. 1 is a router that enables the meter 102 and/or other devices in the media presentation environment (e.g., the media device 110) to communicate with the network 118 (e.g., the Internet.)

In some examples, the example gateway 116 facilitates delivery of media from the media source 112 to the media device 110 via the Internet. In some examples, the example gateway 116 includes gateway functionality, such as modem capabilities. In some other examples, the example gateway 116 is implemented in two or more devices (e.g., a router, a modem, a switch, a firewall, etc.). The gateway 116 of the illustrated example may communicate with the network 118 via Ethernet, a digital subscriber line (DSL), a telephone line, a coaxial cable, a USB connection, a Bluetooth connection, any wireless connection, etc.

In some examples, the example gateway 116 hosts a Local Area Network (LAN) for the media presentation environment 104. In the illustrated example, the LAN is a wireless local area network (WLAN), and allows the meter 102, the media device 110, etc. to transmit and/or receive data via the Internet. Alternatively, the gateway 116 may be coupled to such a LAN. In some examples, the gateway 116 may be implemented with the example meter 102 disclosed herein. In some examples, the gateway 116 may not be provided. In some such examples, the meter 102 may communicate with the central facility 114 via cellular communication (e.g., the meter 102 may employ a built-in cellular modem).

The network 118 of the illustrated example is a wide area network (WAN) such as the Internet. However, in some examples, local networks may additionally or alternatively be used. Moreover, the example network 118 may be implemented using any type of public or private network, such as, but not limited to, the Internet, a telephone network, a local area network (LAN), a cable network, and/or a wireless network, or any combination thereof.

The central facility 114 of the illustrated example is implemented by one or more servers. The central facility 114 processes and stores data received from the meter 102. For example, the example central facility 114 of FIG. 1 combines audience monitoring data and program identification data from multiple households to generate aggregated media monitoring information. The central facility 114 generates reports for advertisers, program producers and/or other interested parties based on the compiled statistical data. Such reports include extrapolations about the size and demographic composition of audiences of content, channels and/or advertisements based on the demographics and behavior of the monitored panelists.

As noted above, the meter 102 of the illustrated example provides a combination of media (e.g., content) metering and people metering. The example meter 102 of FIG. 1 is a stationary device that may be disposed on or near the media device 110. The meter 102 of FIG. 1 includes its own housing, processor, memory and/or software to perform the desired audience measurement and/or people monitoring functions.

In examples disclosed herein, an audience measurement entity provides the meter 102 to the panelist 106, 107, and 108 (or household of panelists) such that the meter 102 may be installed by the panelist 106, 107 and 108 by simply powering the meter 102 and placing the meter 102 in the media presentation environment 104 and/or near the media device 110 (e.g., near a television set). In some examples, more complex installation activities may be performed such as, for example, affixing the meter 102 to the media device 110, electronically connecting the meter 102 to the media device 110, etc.

To identify and/or confirm the presence of a panelist present in the media device 110, the example meter 102 of the illustrated example includes an example display 132. For example, the display 132 provides identification of the panelists 106, 107, 108 present in the media presentation environment 104. For example, in the illustrated example, the meter 102 displays indicia or visual indicators (e.g., illuminated numerals 1, 2 and 3) identifying and/or confirming the presence of the first panelist 106, the second panelist 107, and the third panelist 108.

Figure 2:
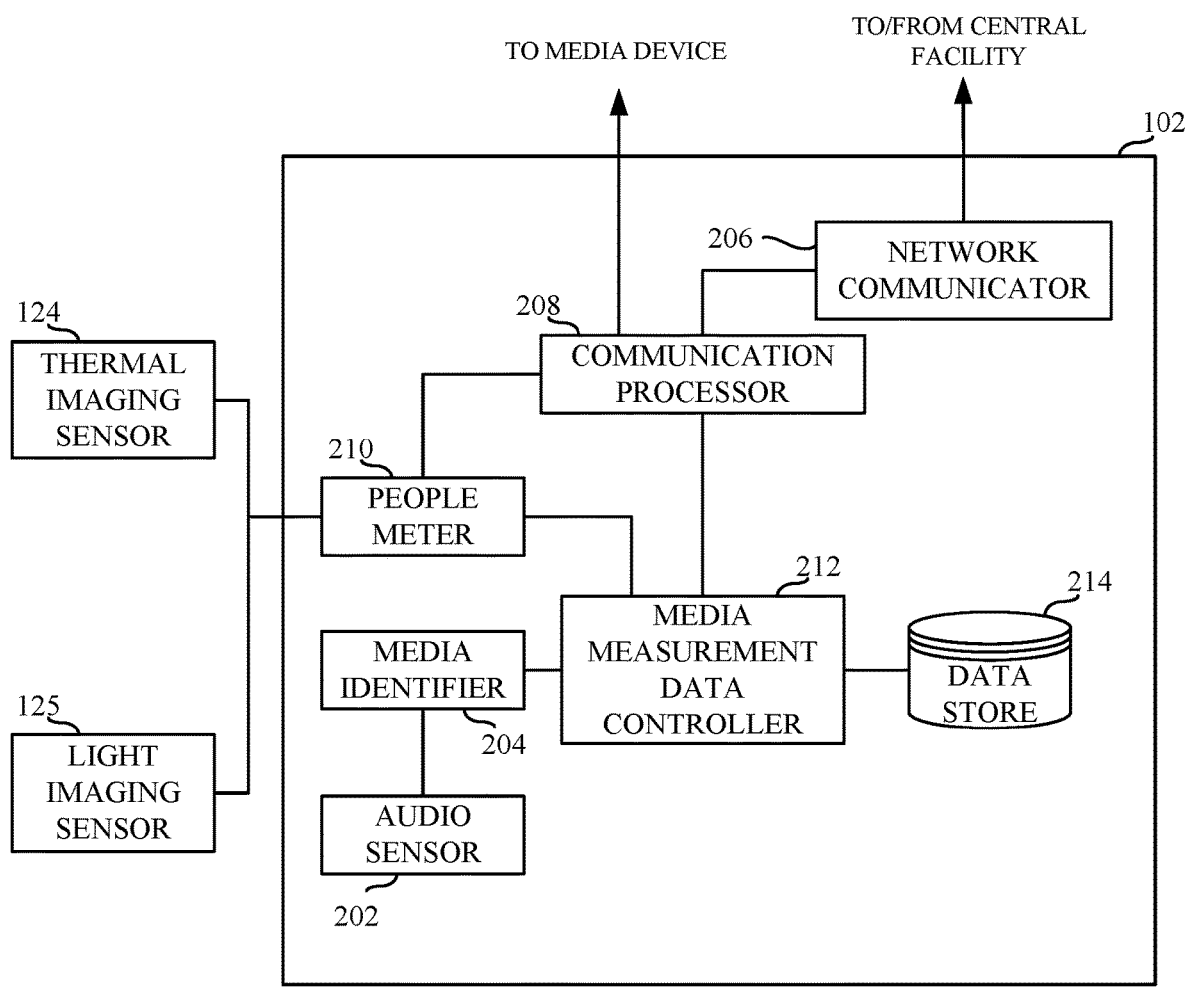
FIG. 2 illustrates a block diagram of the example meter of FIG. 1.

FIG. 2 illustrates a block diagram of the example meter 102 of FIG. 1 to generate exposure data for the media. The example meter 102 of FIG. 2 is coupled to the example thermal imaging sensor 124 and the example light imaging sensor 125 of FIG. 1 to determine audience composition based on frames of thermal image data collected from the example thermal imaging sensor 124 and frames of audience image data collected from the example light imaging sensor 125. The example meter 102 of FIG. 2 includes an example audio sensor 202, an example media identifier 204, an example network communicator 206, an example communication processor 208, an example people meter 210, an example media measurement data controller 212, and an example data store 214.

The example audio sensor 202 of the illustrated example of FIG. 2 is a microphone. The example audio sensor 202 receives ambient sound (e.g., free field audio) including audible media presented in the vicinity of the meter 102. Additionally or alternatively, the example audio sensor 202 may be implemented by a line input connection. The line input connection may allow an external microphone to be used with the meter 102 and/or, in some examples, may enable the audio sensor 202 to be directly connected to an output of a media device 110 (e.g., an auxiliary output of a television, an auxiliary output of an audio/video receiver of a home entertainment system, etc.). Advantageously, the meter 102 is positioned in a location such that the audio sensor 202 receives ambient audio produced by the television and/or other devices of the media presentation environment 104 (FIG. 1) with sufficient quality to identify media presented by the media device 110 and/or other devices of the media presentation environment 104 (e.g., a surround sound speaker system). For example, in examples disclosed herein, the meter 102 may be placed on top of the television, secured to the bottom of the television, etc.

The example media identifier 204 of the illustrated example of FIG. 2 analyzes signals received via the audio received via the audio sensor 202 and identifies the media being presented. The example media identifier 204 of the illustrated example outputs an identifier of the media (e.g., media-identifying information) to the media measurement data controller 212. In some examples, the media identifier 204 utilizes audio and/or video watermarking techniques to identify the media. Additionally or alternatively, the media identifier 204 utilizes signature-based media identification techniques.

The example network communicator 206 of the illustrated example of FIG. 2 is a communication interface configured to receive and/or otherwise transmit corresponding communications to and/or from the central facility 114. In the illustrated example, the network communicator 206 facilitates wired communication via an Ethernet network hosted by the example gateway 116 of FIG. 1. In some examples, the network communicator 206 is implemented by a Wi-Fi radio that communicates via the LAN hosted by the example gateway 116. In other examples disclosed herein, any other type of wireless transceiver may additionally or alternatively be used to implement the network communicator 206. In examples disclosed herein, the example network communicator 206 communicates information to the communication processor 208 which performs actions based on the received information. In other examples disclosed herein, the network communicator 206 may transmit media measurement information provided by the media measurement data controller 212 (e.g., data stored in the data store 214) to the central facility 114 of the media presentation environment 104.

The example communication processor 208 of the illustrated example of FIG. 2 receives information from the network communicator 206 and performs actions based on that received information. For example, the communication processor 208 packages records corresponding to collected exposure data and transmits the records to the central facility 114. In examples disclosed herein, the communication processor 208 communicates with the people meter 210 and/or a media measurement data controller 212 to transmit people count data, demographic data, etc., to the network communicator 206.

The example people meter 210 of the illustrated example of FIG. 2 determines audience monitoring data representative of the number and/or identities of the audience member(s) (e.g., panelists) present in the media presentation environment 104. In the illustrated example, the people meter 210 is coupled to the thermal imaging sensor 124 and the light imaging sensor 125. In some examples, the people meter 210 is coupled to the thermal imaging sensor 124 and/or the light imaging sensor 125 via a direct connection (e.g., Ethernet) or indirect communication through one or more intermediary components. In some examples, the thermal imaging sensor 124 and/or the light imaging sensor 125 is included in (e.g., integrated with) the meter 102. The example people meter 210 collects data from the example thermal imaging sensor 124, the example light imaging sensor 125, and data from example input device(s) 122 corresponding to audience monitoring data. The example people meter 210 provides the audience monitoring data to the media measurement data controller 212 such that the audience monitoring data can be correlated with the media identification data to facilitate an identification of which media was presented to which audience member (e.g., exposure data). The example people meter 210 is described in further detail below in connection with FIGS. 3, 4, 5, and 6.

The example media measurement data controller 212 of the illustrated example of FIG. 2 receives media identifying information (e.g., a code, a signature, etc.) from the media identifier 204 and audience monitoring data from the people meter 210 and stores the received information in the data store 214. The example media measurement data controller 212 periodically and/or a-periodically transmits, via the network communicator 206, the media measurement information stored in the data store 214 to the central facility 114 for post-processing of media measurement data, aggregation and/or preparation of media monitoring reports. In some examples, the media measurement data controller 212 generates exposure data. For example, the media measurement data controller 212 correlates the media identifying information with audience monitoring data, as described above, to generate exposure data.

The example data store 214 of the illustrated example of FIG. 2 may be implemented by any device for storing data such as, for example, flash memory, magnetic media, optical media, etc. Furthermore, the data stored in the example data store 214 may be in any data format such as, for example, binary data, comma delimited data, tab delimited data, structured query language (SQL) structures, etc. In the illustrated example, the example data store 214 stores media identifying information collected by the media identifier 204 and audience monitoring data collected by the people meter 210.

Figure 3:
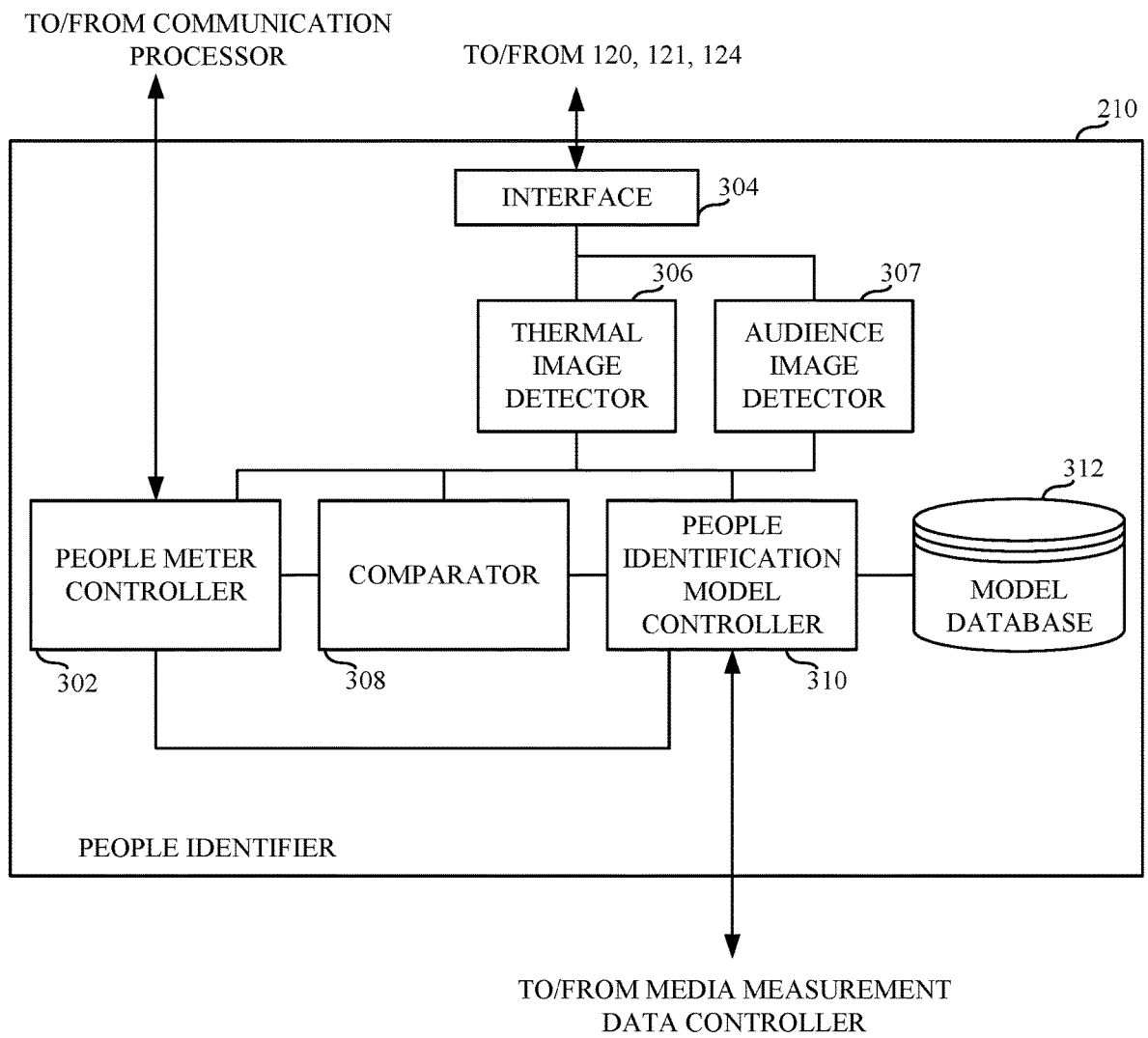
FIG. 3 illustrates a block diagram of an example people meter included in the example meter of FIG. 2 to determine an audience composition for audience monitoring data.

FIG. 3 illustrates a block diagram of the example people meter 210 of FIG. 2, which is to determine an audience composition for audience monitoring data in accordance with teachings of this disclosure. The example people meter 210 includes an example people meter controller 302, an example interface 304, an example thermal image detector 306, an example audience image detector 307, an example comparator 308, an example people identification model controller 310, and an example model database 312.

The example people meter controller 302 of the illustrated example of FIG. 3 obtains user input from example input device(s) 122. For example, the panelists 106, 107, and 108 may press a key on the respective input device(s) 122 indicating they are in the room (e.g., the media presentation environment 104). In some examples, the panelists 106, 107, 108 enter a username, password, and/or other information to indicate who they are and that they are in the room viewing media. In some examples, the people meter controller 302 determines a people count based on the user input obtained from the input device(s) 122. For example, the people meter controller 302 may determine that two people (e.g., two of the panelists 106, 107, 108) have indicated their presence in the media presentation environment 104. The example people meter controller 302 provides the people count to the example comparator 308.

In some examples, the people meter controller 302 generates prompting messages at periodic and/or aperiodic scheduling intervals. For example, the people meter controller 302 generates a prompting message to be displayed on the media device 110 and/or a display of the meter 102. The prompting messages can include questions and/or requests to which the panelists 106, 107, 108 are to respond. For example, the people meter controller 302 may generate a prompting message every 42 minutes (or at some other interval) asking the panelists 106, 107, 108 if they are still viewing the media. In some examples, the people meter controller 302 generates a prompting message based on one or more events, such as when the media device 110 is turned on, when the channel has changed, when the media source has changed, etc. In some examples, the people meter controller 302 receives a trigger from the comparator 308 to determine whether to generate prompting messages or not generate prompting messages. The example people meter controller 302 communicates the prompting messages through the communication processor 208 of FIG. 2 to the media device 110.

The example interface 304 of the illustrated example of FIG. 3 communicates between the example thermal imaging sensor 124, the example light imaging sensor 125, the example thermal image detector 306, and the example audience image detector 307. For example, the interface 304 obtains data from the thermal imaging sensor 124 and provides the data to the example thermal image detector 306. Additionally or alternatively, the interface 304 obtains data from the light imaging sensor 125 and provides the data to the example audience image detector 307. In some examples, the interface 304 obtains requests from the example thermal image detector 306 and passes the requests to the example thermal imaging sensor 124. In some examples, the interface 304 obtains requests from the example audience image detector 307 and passes the requests to the example light imaging sensor 125. For example, the interface 304 enables communication between the thermal imaging sensor 124 and the thermal image detector 306, and between the light imaging sensor 125 and the audience image detector 307. The example interface 304 may be any type of interface, such as a network interface card (NIC), an analog-to-digital converter, a digital-to-analog converter, Universal Serial Bus (USB), GigE, FireWire, Camera Link®, etc.

The example thermal image detector 306 of the illustrated example of FIG. 3 obtains thermal image data from the example interface 304 and determines a heat blob count based on the thermal image data. For example, the thermal image detector 306 obtains frames of thermal image data from the thermal imaging sensor 124 via the interface 304 and analyzes the frames. In some examples, the thermal image detector 306 determines human sized blobs of heat, or human size heat blobs, in the frames. In some examples, the thermal image detector 306 analyzes the frames of thermal image data for temperature values and particular shapes to evaluate if the blobs are indicative of humans. For example, the frames of thermal image data can include an oval shape corresponding to a temperature in the range of 92.3-98.4° F. (e.g. the body temperature of a human). Additionally or alternatively, the frames of thermal image data can include a rectangular shape corresponding to a temperature of 60° F. (e.g., representative of furniture). The example thermal image detector 306 generates a heat blob count based on the number of detected human size heat blobs and provides the count to the example comparator 308. In some examples, the example thermal image detector 306 provides output information indicative of thermal image data analysis results to the example people identification model controller 310. The example thermal image detector 306 is described in further detail below in connection with FIG. 4.

The example audience image detector 307 of the illustrated example of FIG. 3 obtains audience image data from the example interface 304 and identifies an audience member based on the audience image data. For example, the audience image detector 307 obtains frames of audience image data from the light imaging sensor 125 via the interface 304 and analyzes the frames. In some examples, the audience image detector 307 identifies one or more audience members in the frames using facial recognition analysis. The example audience image detector 307 provides output information indicative of audience member identification to the example people identification model controller 310.

In some examples, the audience image detector 307 is unable to identify the person in the frame of audience image data. For example, the person in the frame of audience image data may be a visitor, a distant relative of the panelist(s) associated with the monitored location, etc. In such an example, the audience image detector 307 triggers the people meter controller 302 to generate a prompting message for additional member logging. As used herein, member logging occurs when a given audience member logs into their respective input device 122 (or into a common input device 122 used in the environment) to indicate that they are viewing the media. The example people meter controller 302 generates the prompting message in an effort to obtain a response to verify the audience composition and generate accurate audience monitoring data. The example audience image detector 307 is described in further detail below in connection with FIG. 5.

The example comparator 308 of the illustrated example of FIG. 3 obtains the heat blob count at time t and the heat blob count at time t−1 from the example thermal image detector 306 and compares the two count values. That is, the comparator 308 compares the heat blob count at a first time (e.g., time t) and the heat blob count at a relatively earlier time (e.g., time t−1). The example comparator 308 determines if the count values are equal in value. When the comparator 308 determines the count values match, then the people count is verified. In some examples, when the people count is verified, the example comparator 308 notifies the example people meter controller 302 to reset a scheduling interval timer (e.g., a counter, clock, or other timing mechanisms) that initiate the generation of prompting messages. For example, if the people meter controller 302 is configured to generate prompting messages every 42 minutes, then a timer is set to 42 minutes. When the timer expires, a prompting message is triggered. However, if the comparator 308 verifies the number of people (e.g., the panelists 106, 107, 108) in the media presentation environment 104, a prompting message is not needed to determine whether people are still viewing the media.

In some examples, the comparator 308 determines the two heat blob count values are not equal. For example, there may only be one heat blob count (e.g., thermal imaging was not previously active). Thus, the comparator 308 determines the heat blob count does not match (e.g., compared to a heat blob count of zero corresponding to an inactive thermal imaging sensor 124 (FIG. 1)). In some examples, the heat blob counts do not match due to an audience member (e.g., a panelist) leaving the media presentation environment 104, an audience member (e.g., a panelist) joining the media presentation environment 104, etc. In such examples, the example comparator 308 triggers the audience image detector 307 to activate the light image sensor 125 to capture audience image data.

The example comparator 308 provides the heat blob count to the example people identification model controller 310. In some examples, the comparator 308 determines a time of the comparison between the heat blob counts and provides the time to the people identification model controller 310. For example, the comparator 308 may identify 4:58 pm as the time corresponding to the comparison between the heat blob counts. In some examples, the comparator 308 updates, or otherwise trains, the people identification model when the comparator 308 provides the heat blob count and the time corresponding to the comparison to the people identification model controller 310.

The example people identification model controller 310 of the illustrated example of FIG. 3 trains a people identification model based on data obtained from the example comparator 308, the example people meter controller 302, the example thermal image detector 306, and the example audience image detector 307. In some examples, the people identification model controller 310 is in communication with the example media measurement data controller 212 of FIG. 2. For example, the people identification model controller 310 obtains information from the media measurement data controller 212 and provides information to the media measurement data controller 212. In some examples, the data obtained from the media measurement data controller 212 by the people identification model controller 310 includes media identifying information. For example, the people identification model controller 310 queries the media measurement data controller 212 for media identifying information at the time corresponding to the comparison of heat blob counts and/or the time corresponding to the identification of audience members. In some examples, the media measurement data controller 212 provides the data to the people identification model controller 310 without receiving a request and/or query. In this manner, the people identification model controller 310 obtains the audience composition at, for example, 4:58 pm and obtains the broadcast channel airing on the media device 110 at 4:58 pm. In some examples, the people identification model controller 310 utilizes the data from one or more of the people meter controller 302, the thermal image detector 306, the audience image detector 307, the comparator 308, and the media measurement data controller 212 to train a model to predict a verified audience composition for particular dates and times.

In some examples, the people identification model controller 310 passes the verified audience composition to the media measurement data controller 212. For example, the people identification model controller 310 obtains the verified audience composition, packages the information, and provides the information to the media measurement data controller 212 for generation of exposure data. For example, the media measurement data controller 212 utilizes the information to correlate the verified audience composition with the media identifying information. In some examples, the people identification model controller 310 obtains demographic information from the people meter controller 302 to pass to the media measurement data controller 212. For example, the people meter controller 302 determines the demographic information corresponding to the panelists logged into the meter 102 and/or identified by the audience image detector 307. In this manner, the example people identification model controller 310 passes the audience composition (e.g., the people count and the demographic information of the identified panelists), and the time corresponding to the identification to the media measurement data controller 212 to generate exposure data. The example people identification model controller 310 is described in further detail below in connection with FIG. 6.

The example model database 312 of the illustrated example of FIG. 3 stores people identification models generated by the people identification model controller 310. For example, the model database 312 may periodically or a-periodically receive new, updated, and/or trained people identification models. In some examples, the model database 312 stores one people identification model. In some examples, the model database 312 stores multiple people identification models. The example model database 312 is utilized for subsequent retrieval by the people meter controller 302, the thermal image detector 306, the audience image detector 307, and/or the people identification model controller 310.

Figure 4:
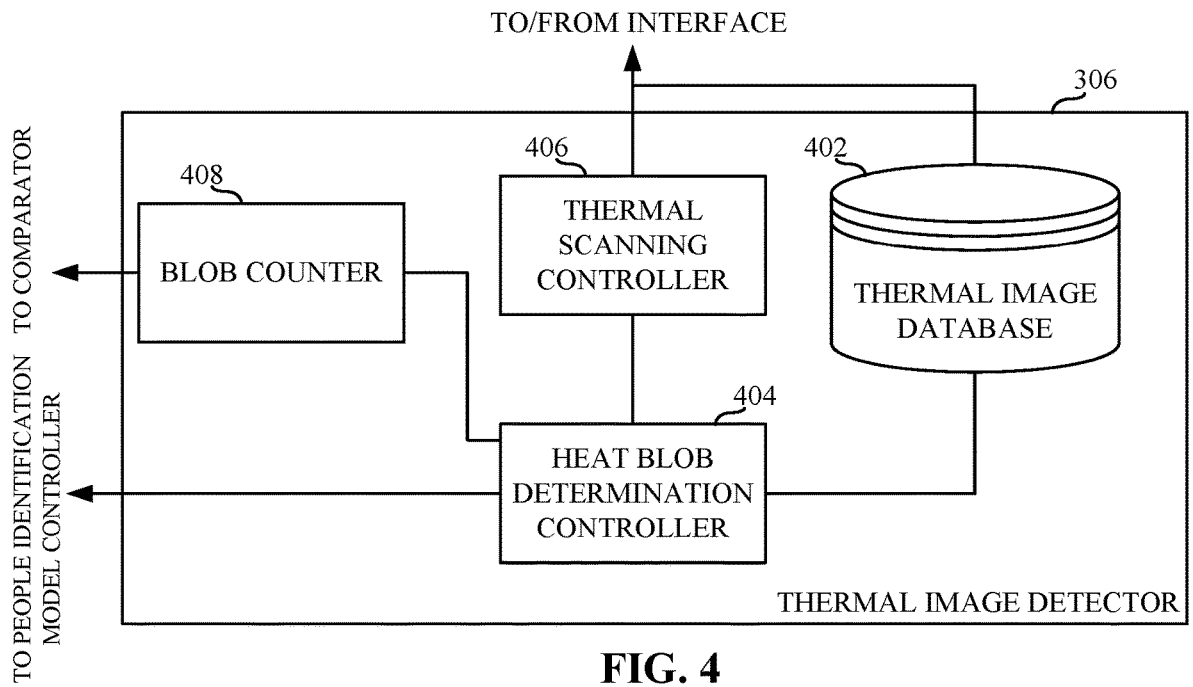
FIG. 4 illustrates a block diagram of an example thermal image detector included in the example people meter of FIG. 3 to determine a heat blob count.

FIG. 4 is a block diagram illustrating an example implementation of the thermal image detector 306 of FIG. 3. The example thermal image detector 306 of FIG. 3 includes an example thermal image database 402, an example heat blob determination controller 404, an example scanning controller 406, and an example blob counter 408.

The example thermal image database 402 of the illustrated example of FIG. 4 stores frames of thermal image data obtained from the example interface 304 of FIG. 3. For example, the thermal image database 402 stores the frames of thermal image data captured by the example thermal imaging sensor 124 for current and/or subsequent use by the heat blob determination controller 404. In some examples, the thermal image database 402 stores tagged and/or analyzed frames of thermal image data.

The example heat blob determination controller 404 of the illustrated example of FIG. 4 obtains a frame of the thermal image data from the example thermal image database 402. The example heat blob determination controller 404 analyzes the frame for human sized heat blobs. In an example operation, the heat blob determination controller 404 identifies portions of the frame that warrant further attention. For example, the heat blob determination controller 404 detects warm areas of the frame that are to be analyzed further. A warm area of the frame can be determined based on the color of the pixels in that area. In some examples, the heat blob determination controller 404 includes configuration data corresponding to the color scale of the thermal image data. The example heat blob determination controller 404 utilizes the color scale to identify temperature associated with a pixel color. In some examples, the configuration data is specific to the particular thermal imaging sensor 124. For example, the configuration data may be based on whether the thermal imaging sensor 124 includes an image processor with greyscale imaging, colored imaging, etc. For example, the configuration data for an example greyscale implementation heat blob determination controller 404 may specify that a white-colored pixel is associated with a first temperature, a lighter grey-colored pixel is associated with a second temperature lower than the first temperature, and a black-colored pixel is associated with a third temperature lower than both the first and second temperatures. Configuration data for an example color scale implementation of the heat blob determination controller 404 may specify that a red-colored pixel is associated with a first temperature, an orange-colored pixel is associated with a second temperature relatively lower than the first temperature, and a yellow-colored pixel is associated with a third temperature relatively lower than both the first and second temperatures.

In further operation, the heat blob determination controller 404 detects features of the frame that are incompatible with the presence of a human, or a small group of humans, and discards those features. For example, the heat blob determination controller 404 identifies cool areas of the frame, areas with hard edges, etc. By discarding the incompatible features, the example heat blob determination controller 404 improves the probability and accuracy of detecting a human size heat blob.

The example heat blob determination controller 404 filters the identified areas of the frame by applying symmetry, size, and/or distance constraints. For example, the heat blob determination controller 404 utilizes convolutional filtering, where a filter (or multiple filters) indicative of a shape (e.g., a target shape of a potential heat blob), size (e.g., a target size of a potential heat blob), and/or distance (e.g., a target distance of a potential heat blob) is convolved over the identified areas of the frame. In such an example, edge detection techniques may be utilized to identify an area of the frame that corresponds to an edge (e.g., an outline of a human head, arm, leg, etc.), where the identified area is convolved with one or more filters. For example, the heat blob determination controller 404 may implement step detection, change detection, and any other edge detection techniques to identify an area of the frame corresponding to an edge. The example heat blob determination controller 404 filters the identified areas of the frame to detect lines and features that correspond to the shape of a human. In some examples, the heat blob determination controller 404 performs multiple filtering techniques with multiple filters.

In some examples, the filters of the heat blob determination controller 404 are calibrated based on the location and/or positioning of the thermal imaging sensor 124 in the media presentation environment 104. For example, the heat blob determination controller 404 includes positioning information of the thermal imaging sensor 124. Such positioning information can be used to determine distance between the thermal imaging sensor 124 and an area of interest in a thermal image frame. In some examples, the filters are adjusted to accommodate for the determined distance. For example, if the heat blob determination controller 404 determines an area of interest was captured x feet away from the thermal imaging sensor 124, then the filters are adjusted (e.g., tuned, updated, etc.) to include reduced and/or increased sized shapes (e.g., based on the value of x).

In some examples, the heat blob determination controller 404 fuses and/or otherwise connects two or more outputs of the filter detection for evaluation of the frame. For example, the connected outputs include information indicative of one or more shapes in the frame. In some examples, neural networks, adaptive boosting, and/or other types of models are used to evaluate the connected (e.g., fused) outputs of the filter detection. After evaluation, the example heat blob determination controller 404 identifies one or more human size heat blobs. In some examples, the heat blob determination controller 404 outputs the evaluation to the example blob counter 408.

In some examples, the heat blob determination controller 404 does not detect human size heat blobs in the frame. In such an example, the heat blob determination controller 404 may send a trigger to the scanning controller 406 to prompt the scanning controller 406 to capture more frames of thermal image data of the media presentation environment 104. For example, the thermal image detector 306 may be initiated to detect heat blobs (e.g., heat representation of the exterior temperature of an object or person) when the media device 110 is turned on. In such examples, when the media device 110 is turned on, an audience is generally present. If the example heat blob determination controller 404 does not detect human size heat blobs, then a recapture of the environment is to occur. For example, an audience member may have briefly left the room after turning on the media device 110, the thermal imaging sensor 124 may have not captured the media presentation environment 104 when the media device 110 was turned on, etc.

In some examples, the heat blob determination controller 404 provides the connected output and/or evaluation results to the example people identification model controller 310. The example people identification model controller 310 utilizes the connected output and/or evaluation results as training data for predicting a people count of the media presentation environment 104.

The example blob counter 408 of the illustrated example of FIG. 4 obtains the evaluation output from the heat blob determination controller 404 corresponding to a number, if any, of human size heat blobs. For example, the heat blob determination controller 404 provides information indicative of the evaluation of the frame of thermal image data to the blob counter 408. The example blob counter 408 includes a counter, such as a device which stores a number of times a heat blob corresponds to a human. If the example blob counter 408 determines that human size heat blobs were detected, then the example blob counter 408 increments the counter to the number of heat blobs that were detected. For example, if the heat blob determination controller 404 detected five human size heat blobs, the blob counter 408 stores a count of five heat blobs. If the example blob counter 408 does not receive information indicative of a detection of human size heat blobs, then the example blob counter 408 updates the blob counter with a count of zero.

In some examples, the blob counter 408 tags the frame of thermal image data with the heat blob count. For example, the frame includes metadata indicative of a time the frame was captured, the size of the frame, the device that captured the frame, etc., and further includes the heat blob count appended by the blob counter 408. In some examples, the tagged frame is stored in the thermal image database 402 and/or provided to the example comparator 308 and the example people identification model controller 310.

In some examples, the thermal image database 402, the heat blob determination controller 404, the scanning controller 406, the blob counter 408, and/or otherwise the thermal image detector 306 may be coupled to the people identification model controller 310 of FIG. 3 in an effort to provide training data (e.g., people monitoring data) to the people identification model. In some examples, it is beneficial to provide training data (e.g., people monitoring data) to the people identification model controller 310 to train the people identification model to predict heat blob counts at particular times throughout the day.

Figure 5:
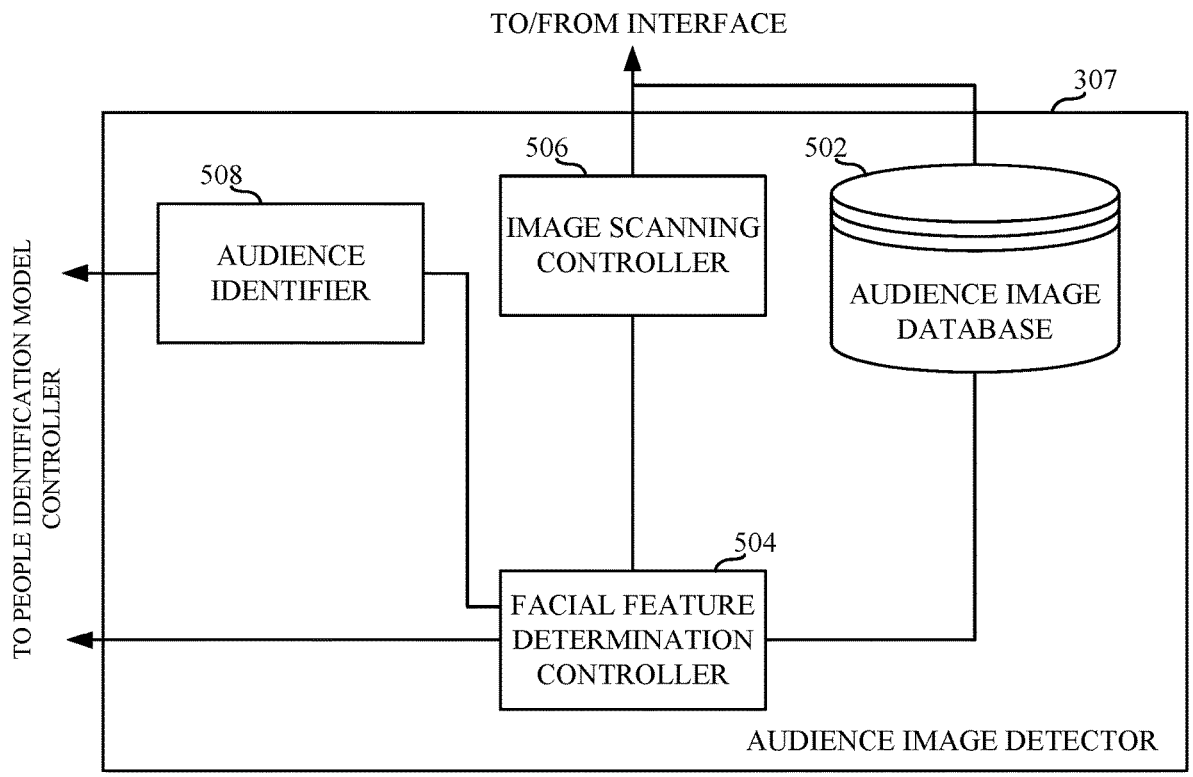
FIG. 5 illustrates a block diagram of an example audience image detector included in the example people meter of FIG. 3 to identify audience members.

FIG. 5 is a block diagram illustrating an example implementation of the audience image detector 307 of FIG. 3. The example audience image detector 307 of FIG. 3 includes an example audience image database 502, an example facial feature determination controller 504, an example scanning controller 506, and an example audience identifier 508.

The example audience image database 502 of the illustrated example of FIG. 4 stores frames of audience image data obtained from the example interface 304 of FIG. 3. For example, the audience image database 502 stores the frames of audience image data captured by the example light imaging sensor 125 for current and/or subsequent use by the facial feature determination controller 504. In some examples, the audience image database 502 stores tagged and/or analyzed frames of audience image data.

The example facial feature determination controller 504 of the illustrated example of FIG. 5 obtains a frame of the audience image data from the example audience image database 502. The example facial feature determination controller 504 analyzes the frame for audience member faces. In an example operation, the facial feature determination controller 504 identifies portions of the frame that warrant further attention. For example, the facial feature determination controller 504 detects facial features present in the frame that are to be analyzed further. For example, the facial feature determination controller 504 detects eyes, a nose, a mouth, etc. using object-class detection.

In further operation, the facial feature determination controller 504 detects features of the frame that are incompatible with the presence of a human, or a small group of humans, and discards those features. For example, the facial feature determination controller 504 identifies areas with hard edges, inanimate objects (e.g., a table, a chair, a phone, etc.), etc. By discarding the incompatible features, the example facial feature determination controller 504 improves the probability and accuracy of detecting a human face.

The example facial feature determination controller 504 filters the identified areas of the frame by applying symmetry, size, and/or distance constraints. For example, the facial feature determination controller 504 utilizes convolutional filtering, where a filter that is indicative of a shape (e.g., a target shape of a potential human face), size (e.g., a target size of a potential human face), and/or distance (e.g., a target distance of a potential human face) is convolved over the identified areas of the frame. In such an example, edge detection techniques may be utilized to identify an area of the frame that corresponds to an edge (e.g., an outline of a human head, arm, leg, etc.), where the identified area is convolved with one or more filters. For example, the facial feature determination controller 504 may implement step detection, change detection, and any other edge detection techniques to identify an area of the frame corresponding to an edge. The example facial feature determination controller 504 filters the identified areas of the frame to detect lines and features that correspond to the shape of a human. In some examples, the facial feature determination controller 504 performs multiple filtering techniques with multiple filters.

In some examples, the filters of the facial feature determination controller 504 are calibrated based on the location and/or positioning of the light imaging sensor 125 in the media presentation environment 104. For example, the facial feature determination controller 504 includes positioning information of the light imaging sensor 125. Such positioning information can be used to determine distance between the light imaging sensor 125 and an area of interest in an image frame. In some examples, the filters are adjusted to accommodate for the determined distance. For example, if the facial feature determination controller 504 determines an area of interest was captured x feet away from the light imaging sensor 125, then the filters are adjusted (e.g., tuned, updated, etc.) to include reduced and/or increased sized shapes (e.g., based on the value of x).

In some examples, the facial feature determination controller 504 fuses and/or otherwise connects two or more outputs of the filter detection for evaluation of the frame. For example, the connected outputs include information indicative of one or more shapes in the frame. In some examples, neural networks, adaptive boosting, and/or other types of models are used to evaluate the connected (e.g., fused) outputs of the filter detection. After evaluation, the example facial feature determination controller 504 identifies one or more human faces. In some examples, the facial feature determination controller 504 outputs the evaluation to the example audience identifier 508.

In some examples, the facial feature determination controller 504 does not detect human faces in the frame. Additionally or alternatively, the comparator 308 (FIG. 3) may detect a change in heat blob counts. In such examples, the facial feature determination controller 504 may send a trigger to the scanning controller 506 to prompt the scanning controller 506 to capture more frames of audience image data of the media presentation environment 104. For example, the audience image detector 307 may be initiated to detect human faces when the thermal image detector 306 detects heat blobs. In such examples, when heat blobs are detected, an audience is generally present. The example scanning controller 506 controls the FOV of the light imaging sensor 125. For example, the scanning controller 506 obtains frames of thermal image data from the thermal image detector 306 including at least one heat blob indicative of a human. The example scanning controller 506 directs the light imaging sensor 125 to capture frames of audience image data corresponding to the location in the audience of the frames of thermal image data. If the example facial feature determination controller 504 does not detect human faces, then a recapture of the environment is to occur. For example, an audience member may have briefly left the room after turning on the media device 110, the light imaging sensor 125 may have not captured the media presentation environment 104 when the thermal image detector 306 detected heat blobs, etc.

In some examples, the facial feature determination controller 504 provides the connected output and/or evaluation results to the example people identification model controller 310. The example people identification model controller 310 utilizes the connected output and/or evaluation results as training data for predicting a people count of the media presentation environment 104.

The example audience identifier 508 of the illustrated example of FIG. 5 obtains the evaluation output from the facial feature determination controller 504 corresponding to a number, if any, of human faces. For example, the facial feature determination controller 504 provides information indicative of the evaluation of the frame of audience image data to the audience identifier 508. The example audience identifier 508 includes audience data, such as reference audience member images (e.g., reference panelist images) of the faces of the audience members (e.g., panelists) of the household (e.g., the panelists 106, 107, 108 of FIG. 1). If the example audience identifier 508 determines human faces were detected, then the example audience identifier 508 compares the image frames including the human faces to the reference audience member (e.g., panelist) images. If the audience identifier 508 determines a match between the human face and a reference audience member image, the audience identifier 508 logs the audience member as being identified. If the audience identifier 508 determines the human face does not match any of the stored audience member faces in the reference data, the audience identifier 508 may add the respective frame to the reference data.

In some examples, the audience identifier 508 determines whether the number of identified audience members matches the number of heat blobs. For example, the number of audience members identified by the audience identifier 508 may be less than the number of heat blobs. In such an example, the audience identifier 508 did not identify every member in the audience detected by the thermal image detector 306. For example, the frame of audience image data may include audience members not stored in the reference audience member images (e.g., the frame of audience image data depicts a visitor). If the audience identifier 508 determines the number of identified audience members does not match the number of heat blobs, the audience identifier 508 triggers the people meter controller 302 to generate a prompting message for additional member logging.

In some examples, the audience identifier 508 tags the frame of audience image data with the audience member's identity (e.g., assigned panelist number, visitor number, etc.). For example, the frame includes metadata indicative of a time the frame was captured, the size of the frame, the device that captured the frame, etc., and further includes the one or more audience member (e.g., panelist) identities identified by the audience identifier 508. In some examples, the tagged frame is stored in the audience image database 502 and/or provided to example people identification model controller 310.

In some examples, the audience image database 502, the facial feature determination controller 504, the scanning controller 506, the audience identifier 508, and/or otherwise the audience image detector 307 may be coupled to the people identification model controller 310 of FIG. 3 in an effort to provide training data (e.g., people monitoring data) to the people identification model. In some examples, it is beneficial to provide training data (e.g., people monitoring data) to the people identification model controller 310 to train the people identification model to predict audience composition at particular times throughout the day.

Figure 6:
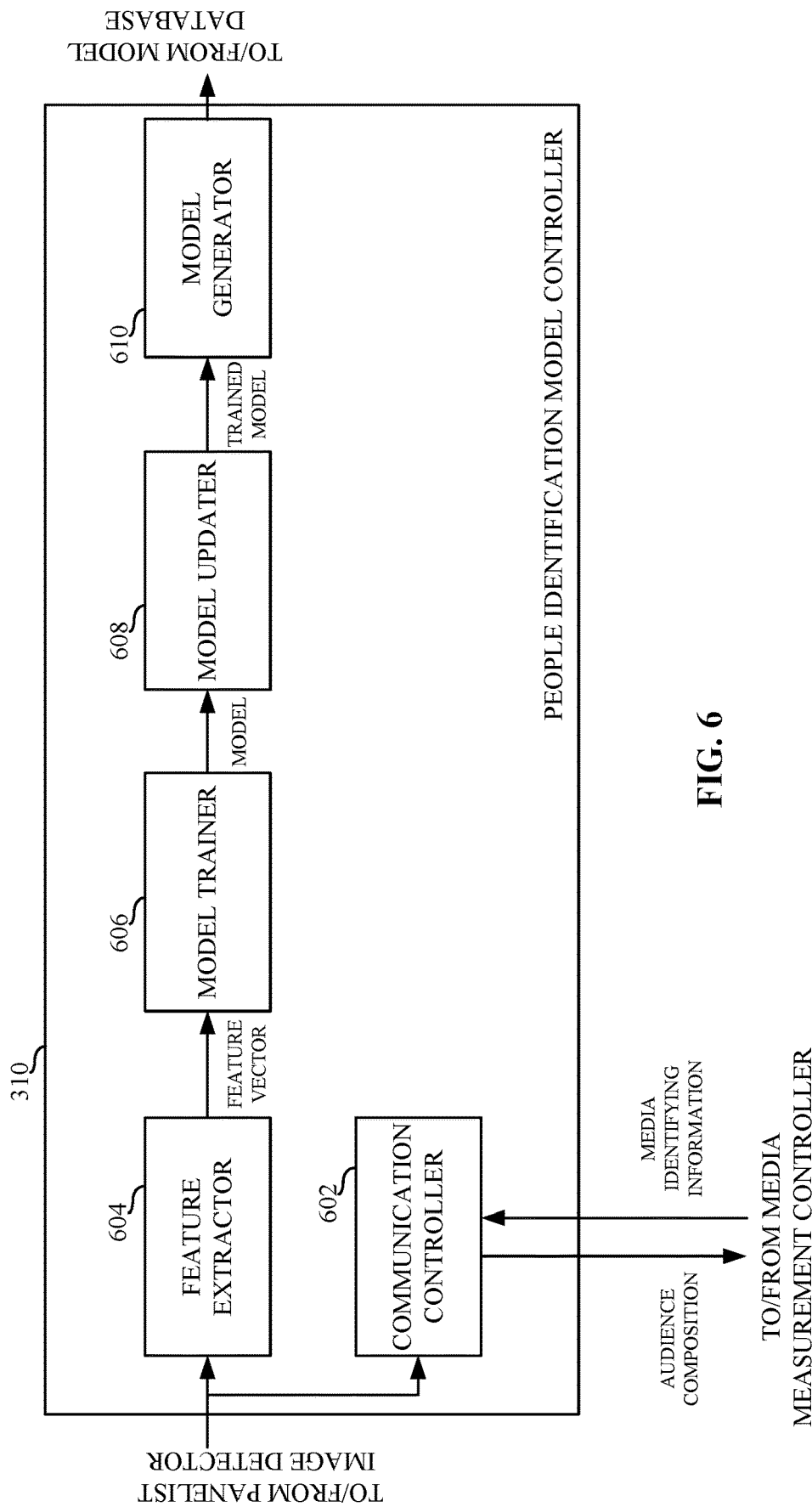
FIG. 6 illustrates a block diagram of an example people identification model controller included in the example people meter of FIG. 3 to train a model to determine an audience composition of the media presentation environment of FIG. 1.

Turning to FIG. 6, a block diagram illustrating the example people identification model controller 310 of FIG. 3 is depicted to train a model to learn about the presence of an audience of a household media presentation environment. The example people identification model controller 310 includes an example communication controller 602, an example feature extractor 604, an example model trainer 606, an example model updater 608, and an example model generator 610.

The example communication controller 602 of the illustrated example of FIG. 6 obtains information from the example audience image detector 307 of FIG. 3 to pass to the example media measurement data controller 212 of FIG. 2. The example communication controller 602 is communicatively coupled to the example audience image detector 307, the example media measurement data controller 212, and the example feature extractor 604. In some examples, the communication controller 602 provides the audience composition to the media measurement data controller 212. For example, the audience image detector 307 provides an updated and/or accurate audience composition (e.g., panelists 106, 107, 108) viewing media in the media presentation environment 104. An updated and/or accurate audience composition is a verified audience composition based on the audience member identification from the audience image detector 307 of FIG. 3. In some examples, the communication controller 602 obtains demographic data from the people meter controller 302, indicative of the demographics of the people in the media presentation environment 104, and provides the demographic data to the media measurement data controller 212.

The example feature extractor 604 of the illustrated example of FIG. 6 extracts feature from information obtained from the example comparator 308 of FIG. 3, the example people meter controller 302 of FIG. 3, and the media measurement data controller 212 of FIG. 2. For example, the feature extractor 604 obtains people monitoring data, over time, from one or more of the comparator 308, the thermal image detector 306, the audience image detector 307, the people meter controller 302, and the media measurement data controller 212, and generates a feature vector corresponding to the people monitoring data. In some examples, the feature extractor 604 obtains multiple instances of people monitoring data before generating a feature vector. For example, the feature extractor 604 obtains people monitoring data over the span of a week. The example feature extractor 604 generates or builds derived values of feature vectors (e.g., representative of features in the people monitoring data) that are to be informative and non-redundant to facilitate the training phase of the people identification model controller 310. As used herein, a feature vector is an n-dimensional array (e.g., a vector) of features that represent some physical environment, media display, measurement parameter, etc. For example, a feature vector represents descriptive characteristics of the media presentation environment at a particular date and time.

In the illustrated example of FIG. 6, the feature vector can identify the number of people accounted for in the media presentation environment 104 in addition to the time at which they were accounted, and the media displayed at the time for which they were accounted. The feature vector provided by the feature extractor 604 facilitates the model trainer 606 in training a people identification model to determine an audience composition for a time and a media type. For example, at time t1 on date X in the media presentation environment 104, the feature extractor 604 extracts data indicative of media identifying information for a broadcast of "ABC the Bachelor," as well as data indicative that three identified audience memberss are viewing the broadcast.

In some examples, these extracted features, by themselves, may have limited usefulness, because there is just one such feature event in a given instance of people monitoring data. However, if the feature extractor 604 extracts feature data from multiple instances of people monitoring data, the generated feature vector may be sufficient to train the people identification model. For example, the feature extractor 604 extracts feature data having date X, Y, and Z at the time t1, indicative of media identifying information for the broadcast of "ABC the Bachelor" and indicative that three identified audience members are viewing the broadcast. In such an example, the model trainer 606 can utilize the feature vector to train the people identification model to predict the audience composition for time t1.

The example model trainer 606 of the illustrated example of FIG. 6 trains the people identification model based on the output feature vector of the feature extractor 604. The model trainer 606 operates in a training mode where it receives multiple instances of people monitoring data, generates a prediction, and outputs a people identification model based on that prediction. For the example model trainer 606 generates a people identification model, the model trainer 606 receives feature vectors corresponding to actual representations of the media presentation environment 104. For example, during a training mode, verifications are made about the audience composition of the media presentation environment 104 so that the data they provide to the comparator 308 is suitable for learning. For example, the model trainer 606 receives a feature vector indicative of the features of an actual media presentation environment and identifies a pattern in the features that maps the dates and times of the actual media presentation environment to the audience composition and outputs a model that captures these daily and/or weekly patterns. The example model trainer 606 provides the output people identification model to the example model updater 608 to assist in generating predictions about the audience composition at subsequent dates and times.

The example model updater 608 of the illustrated example of FIG. 6 flags a people identification model received from the model trainer 606 as new and/or updated. For example, the model updater 608 can receive a people identification model from the model trainer 606 that provides a prediction algorithm to determine an audience composition of people in the media presentation environment 104. The model updater 608 determines that a people identification model of this type is new and, therefore, tags it as new. In some examples, the model updater 608 determines that a people identification model of this type has been generated previously and, therefore, will flag the model most recently generated as updated. The example model updater 608 provides the new and/or updated model to the model generator 610.

The example model generator 610 of the illustrated example of FIG. 6 generates a people identification model for publishing. For example, the model generator 610 may receive a notification from the model updater 608 that a new and/or updated people identification model has been trained and the model generator 610 may create a file in which the people identification model is published so that the people identification model can be saved and/or stored as the file. In some examples, the model generator 610 provides a notification to the people meter controller 302, the thermal image detector 306, and/or the audience image detector 307 that a people identification model is ready to be transformed and published. In some examples, the model generator 610 stores the people identification model in the example model database 312 for subsequent retrieval by the people meter controller 302.

In some examples, the people identification model controller 310 determines a people identification model is trained and ready for use when the prediction meets a threshold amount of error. In some examples, the people meter controller 302, the thermal image detector 306, and/or the audience image detector 307 implements the trained people identification model to determine an audience composition of people in a media presentation environment. In some examples, the example people meter 210 implements the people identification model. In such an example, the people identification model would obtain thermal image data from the thermal imaging sensor 124 to make informed decisions about the people count and/or obtain audience image data from the light imaging sensor 125 to make informed decisions about audience member identification, without the use of audience input data. In this manner, the people identification model may augment or replace the people meter controller 302, the thermal image detector 306, the audience image detector 307, and the comparator 308.

While example manners of implementing the people meter 210 of FIG. 2 is illustrated in FIGS. 3, 4, 5, and 6, one or more of the elements, processes and/or devices illustrated in FIGS. 3, 4, 5, and 6 may be combined, divided, re-arranged, omitted, eliminated and/or implemented in any other way. Further, the example people meter controller 302, the example interface 304, the example thermal image detector 306, the example audience image detector 307, the example comparator 308, the example people identification model controller 310, the example model database 312, the example thermal image database 402, the example heat blob determination controller 404, the example thermal scanning controller 406, the example blob counter 408, the example audience image database 502, the example facial feature determination controller 504, the example image scanning controller 506, the example audience identifier 508, the example communication controller 602, the example feature extractor 604, the example model trainer 606, the example model updater 608, the example model generator 610 and/or, more generally, the example people meter 210 of FIG. 2 may be implemented by hardware, software, firmware and/or any combination of hardware, software and/or firmware. Thus, for example, any of the example people meter controller 302, the example interface 304, the example thermal image detector 306, the example audience image detector 307, the example comparator 308, the example people identification model controller 310, the example model database 312, the example thermal image database 402, the example heat blob determination controller 404, the example thermal scanning controller 406, the example blob counter 408, the example audience member image database 502, the example facial feature determination controller 504, the example image scanning controller 506, the example audience identifier 508, the example communication controller 602, the example feature extractor 604, the example model trainer 606, the example model updater 608, the example model generator 610 and/or, more generally, the example people meter 210 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, people meter controller 302, the example interface 304, the example thermal image detector 306, the example audience image detector 307, the example comparator 308, the example people identification model controller 310, the example model database 312, the example thermal image database 402, the example heat blob determination controller 404, the example thermal scanning controller 406, the example blob counter 408, the example audience image database 502, the example facial feature determination controller 504, the example image scanning controller 506, the example audience identifier 508, the example communication controller 602, the example feature extractor 604, the example model trainer 606, the example model updater 608, the example model generator 610 is/are hereby expressly defined to include a non-transitory computer readable storage device or storage disk such as a memory, a digital versatile disk (DVD), a compact disk (CD), a Blu-ray disk, etc. including the software and/or firmware. Further still, the example people meter of FIG. 2 may include one or more elements, processes and/or devices in addition to, or instead of, those illustrated in FIGS. 3, 4, 5, and 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the people meter 210 of FIGS. 3, 4, 5, and 6 are shown in FIGS. 7-10. The machine readable instructions may be one or more executable programs or portion(s) of an executable program for execution by a computer processor and/or processor circuitry, such as the processor 1112 shown in the example processor platform 1100 discussed below in connection with FIGS. 7-10. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example programs are described with reference to the flowcharts illustrated in FIGS. 7-10, many other methods of implementing the example people meter 210 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 7-10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 7:
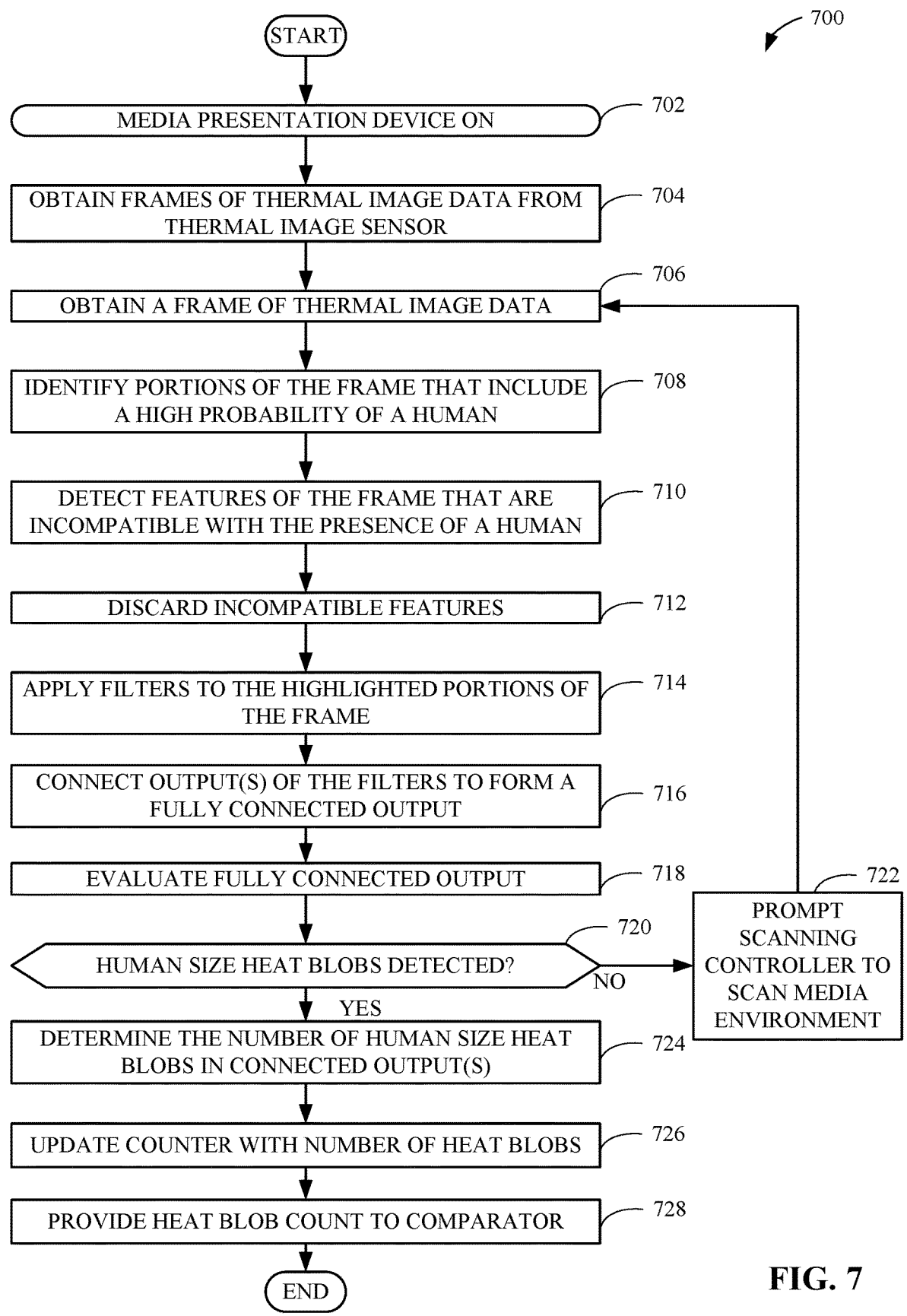
FIG. 7 is a flowchart representative of machine readable instructions which may be executed to implement the example thermal image detector of FIGS. 3 and/or 4 to determine a heat blob count.
Figure 8:
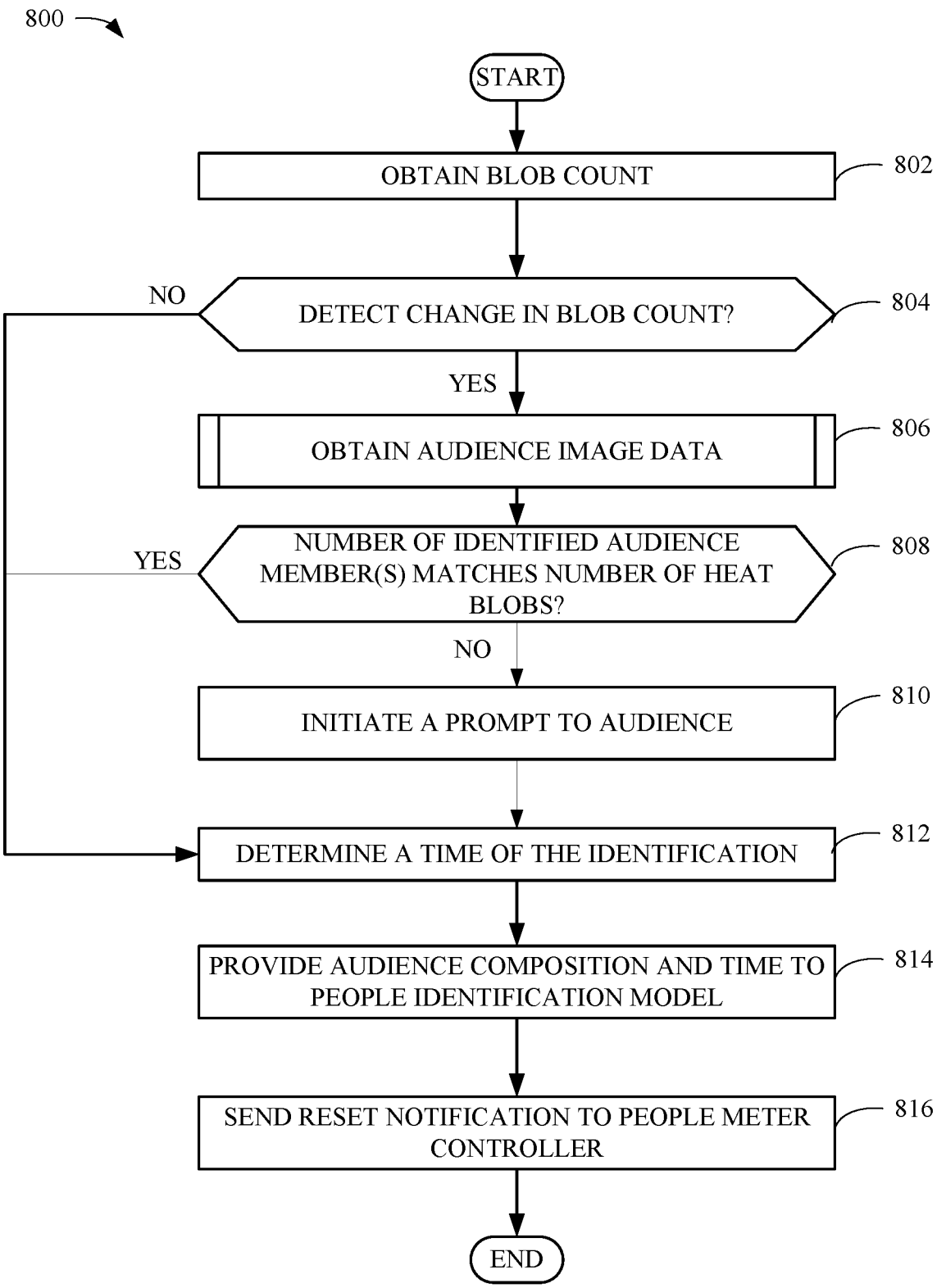
FIG. 8 is a flowchart representative of machine readable instructions which may be executed to implement the example people meter of FIGS. 2, 3, 4, and/or 5 to verify an audience composition of the media presentation environment of FIG. 1.
Figure 9:
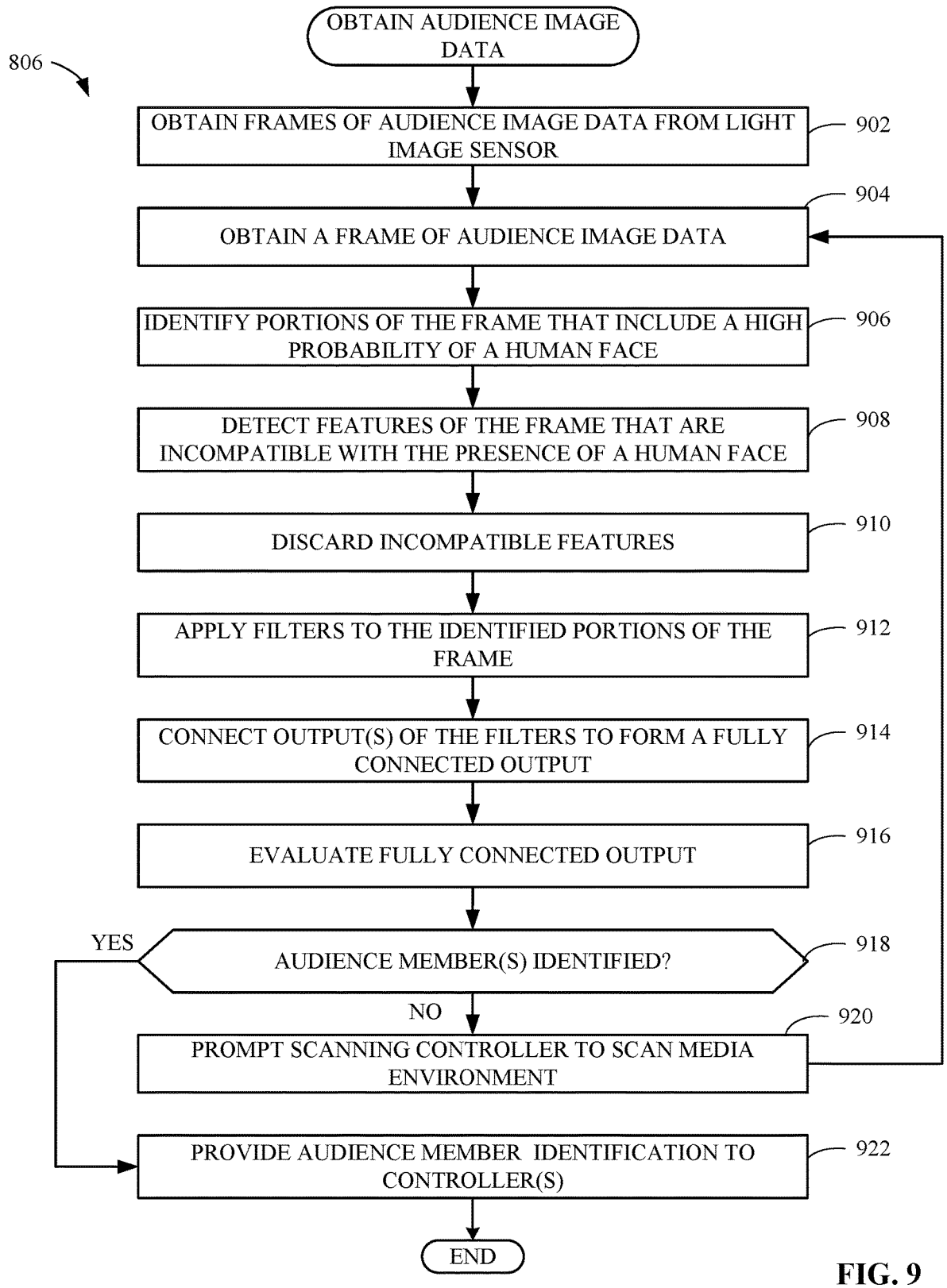
FIG. 9 is a flowchart representative of machine readable instructions which may be executed to implement the example audience image detector of FIGS. 3 and/or 5 to identify audience members.
Figure 10:
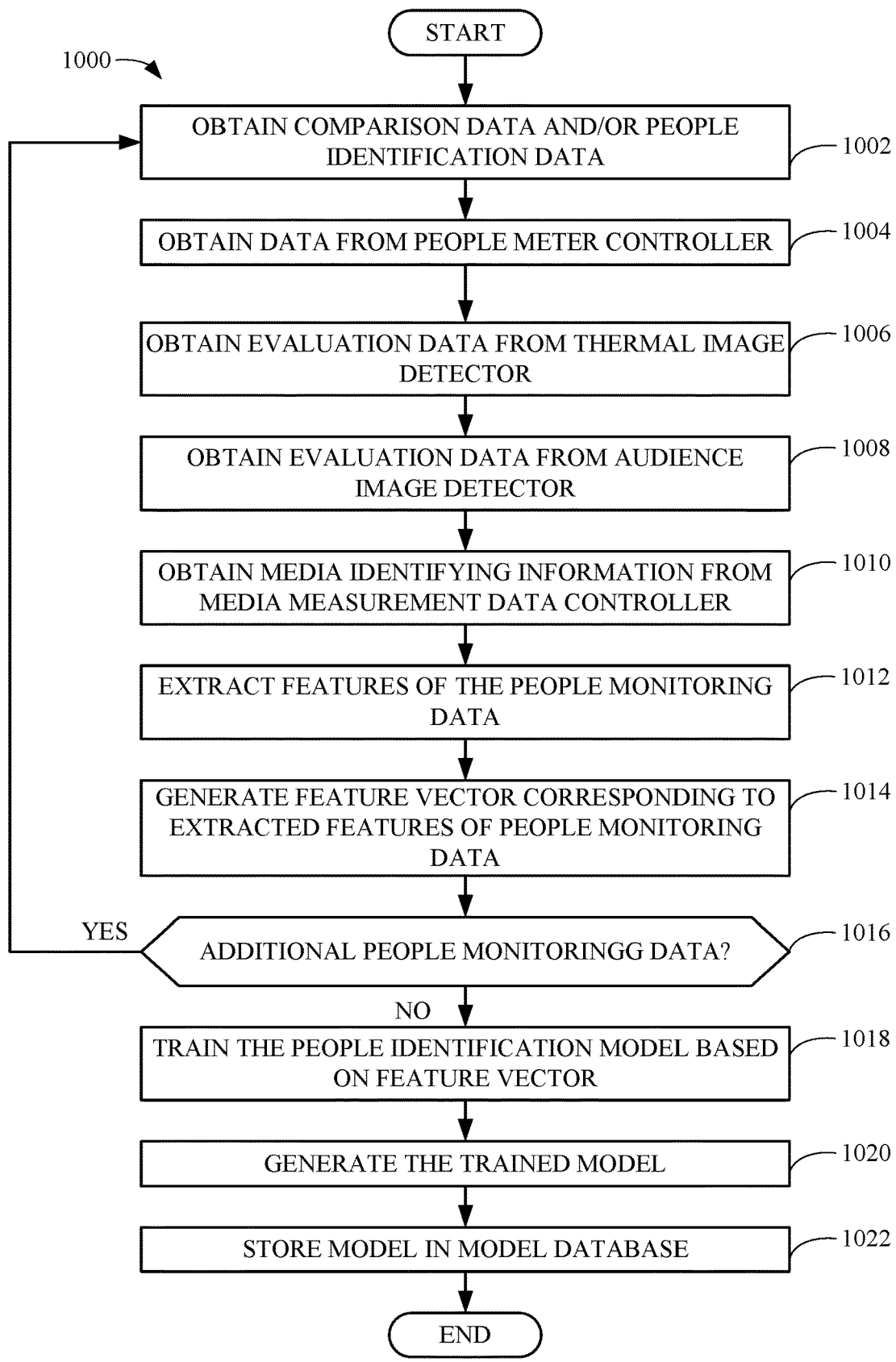
FIG. 10 is a flowchart representative of machine readable instructions which may be executed to implement the example people identification model controller of FIGS. 3 and/or 6 to train the model to determine an audience composition of the media presentation environment of FIG. 1.

FIGS. 7, 8, 9, and 10 illustrate programs that are executed by the example people meter 210 to determine an accurate audience composition utilizing audience input, thermal image data, and/or audience image data. FIG. 7 illustrates an example program 700 implemented by the example thermal image detector 306 of FIGS. 3 and/or 4 to determine a heat blob count. FIG. 8 illustrates an example program 800 implemented by the example people meter 210 of FIGS. 2, 3, 4, and/or 5 to verify an audience composition of the media presentation environment. FIG. 9 illustrates an example program 900 implemented by the example audience image detector 307 of FIGS. 3 and/or 5 to identify audience members. FIG. 10 illustrates an example program 1000 implemented by the example people identification model controller 310 of FIGS. 3 and/or 6 to train the model to determine an audience composition of the media presentation environment.

Turning to FIG. 7, the example heat blob count program 700 begins when the example media device 110 (FIG. 1) is on (block 702). For example, the thermal imaging sensor 124 (FIG. 1) may be activated and begin capturing thermal image data when the media device 110 is turned on, and thus the heat blob count program 700 begins. The example thermal image database 402 (FIG. 4) obtains frames of thermal image data from the example thermal imaging sensor 124 (block 704). For example, the thermal imaging sensor 124 captures frames of thermal image data corresponding to the media presentation environment 104 and stores them in the thermal image database 402.

The heat blob determination controller 404 (FIG. 4) obtains a frame of thermal image data from the thermal image database 402 (FIG. 4) (block 706). For example, the heat blob determination controller 404 queries the thermal image database 402 for frames corresponding to the media presentation environment 104.

The example heat blob determination controller 404 identifies portions of the frame that may include (or likely include) a human (block 708). For example, the heat blob determination controller 404 detects warm areas of the frame that are to be analyzed further, as described above. The example heat blob determination controller 404 detects features of the frame that are incompatible with the presence of a human (block 710). For example, the heat blob determination controller 404 identifies cool areas of the frame, areas with hard edges, etc., as described above. The example heat blob determination controller 404 discards the incompatible features (block 712). For example, the heat blob determination controller 404 removes any groups of pixels that were determined to be incompatible with the presence of a human in an effort to increase the probability and accuracy of detecting human size heat blob(s).

The example heat blob determination controller 404 applies filters to the identified portions of the frame (block 714). For example, the heat blob determination controller 404 convolves filters indicative of a shape, size, and/or distance over the identified portions of the frame to detect lines and features that correspond to the shape of a human. The example the heat blob determination controller 404 connects the output(s) of the filters to form a fully connected output (block 716).

For example, the heat blob determination controller 404 combines (e.g., concatenates, averages, etc.) the outputs of the filters to form the fully connected output layer. The fully connected output layer is indicative of the number of human size and/or human shaped heat blobs detected during the filtering. In this manner, the example heat blob determination controller 404 evaluates the fully connected output (block 718). For example, the heat blob determination controller 404 utilizes the information in the fully connected output to predict and/or otherwise determine if a human size heat blob was detected.

The example heat blob determination controller 404 determines if human size heat blobs were detected (block 720). For example, the heat blob determination controller 404 utilizes the evaluation of the fully connected output to determine if human size heat blobs were detected. If the example heat blob determination controller 404 determines human size heat blobs were not detected (e.g., block 720=NO), then the example heat blob determination controller 404 prompts the scanning controller 406 to scan the media environment (block 722). For example, the heat blob determination controller 404 may send a trigger to the scanning controller 406 to prompt the scanning controller to capture more frames of thermal image data of the media presentation environment 104.

If the example heat blob determination controller 404 determines human size heat blobs were detected (e.g., block 720=YES), then the example heat blob determination controller 404 provides the fully connected output to the example blob counter 408. The example blob counter 408 determines the number of human size heat blobs in the fully connected output (block 724). For example, the blob counter 408 analyzes information in the fully connected output to determine the number of human size heat blobs that were identified in the frame. The example blob counter 408 updates the counter with the number of heat blobs (block 726). For example, the blob counter 408 increments the counter to equal the number of human size heat blobs detected in the image frame.

The example blob counter 408 provides the heat blob count to the comparator 308 (FIG. 3) (block 728). For example, the blob counter 408 is communicatively coupled to the comparator 308, and further provides the heat blob count to the comparator 308 for a comparison to the prompted people count and/or the previously stored heat blob count. The heat blob count program 700 ends when the example blob counter 408 provides the heat blob count to the example comparator 308. The heat blob count program 700 repeats when the example scanning controller 406 (FIG. 4) initiates a new capture of thermal image data. For example, the scanning controller 406 may initiate the thermal imaging sensor 124 to capture frames of the media presentation environment 104, and thus a new and/or same number of heat blobs, in the media presentation environment 104, may be detected.

Turning to FIG. 8, the example program 800 begins when the example scanning controller 506 (FIG. 5) obtains the heat blob count (block 802). For example, the scanning controller 506 obtains the heat blob count from the thermal image detector 306 (FIG. 3) via the interface 304 (FIG. 3).

The example comparator 308 determines if the heat blob count has changed (block 804). For example, the comparator 308 compares the heat blob count to a previously stored heat blob count determined at a previous scan of the media presentation environment 104. In some examples, there is no previous scan of the media presentation environment 104 (e.g., the media device 110 was off). In such an example, the previously stored heat blob count is zero. If the example comparator 308 determines no change in heat blob count (e.g., block 804=NO), the example comparator 308 determines a time of the comparison (block 814). If the example comparator 308 determines a change in heat blob count (e.g., block 804=YES), the example audience image detector 307 obtains audience image data (block 806). For example, the audience image detector 307 operates to analyze frames of audience image data and determine audience member identities in the frames. Further example instructions that may be used to implement block 806 are described below in connection with FIG. 9.

The example audience identifier 508 (FIG. 5) determines whether number of identified audience members matches the number of heat blobs (block 808). For example, the audience identifier 508 compares the number of identified audience members in the frame of audience image data to the number of heat blobs determined by the thermal image detector 306 (FIG. 3).

If the example audience identifier 508 determines the number of identified audience members does not match the number of heat blobs (e.g., block 808=NO), the example people meter controller 302 initiates a prompt to the audience (block 810). For example, the people meter controller 302 generates a prompting message. In this manner, the example people meter controller 302 generates the prompting message in an effort to obtain a response from the audience members to identify the unidentified humans in the frame (e.g., the humans the example audience identifier 508 did not identify but were detected by the example thermal image detector 306) and generate accurate audience monitoring data.

If the example audience identifier 508 determines the number of identified audience members matches the number of heat blobs (e.g., block 808=YES), the example audience identifier 508 (FIG. 3) determines a time of the identification (block 812). For example, the audience identifier 508 identifies the timestamp of when the detected candidate face was compared to the reference audience member face.

The example facial feature determination controller 504 provides the audience composition (e.g., the people count, the members in the audience, etc.) and the time to the people identification model (block 814). For example, the facial feature determination controller 504 outputs information determined from the comparison to train the people identification model. Further, the example audience image detector 307 sends a reset notification to the example people meter controller 302 (block 816). For example, the audience image detector 307 notifies the example people meter controller 302 to reset the scheduling interval timers that determine when prompting messages are to be triggered. In some examples, when the audience image detector 307 provides the notification to the people meter controller 302, the example program 800 ends.

Turning to FIG. 9, the example audience member identification program 900 begins when the audience image database 502 (FIG. 5) obtains frames of audience image data from the example light imaging sensor 125 (block 902). For example, the light imaging sensor 125 captures frames of audience image data corresponding to the media presentation environment 104 and stores them in the audience image database 502. The example facial feature determination controller 504 obtains a frame of audience image data from the audience image database 502 (block 904). For example, the facial feature determination controller 504 queries the audience image database 502 for frames corresponding to the locations of the human sized heat blobs of the media presentation environment 104.

The example facial feature determination controller 504 identifies portions of the frame that may include (or are likely to include) a human face (block 906). For example, the facial feature determination controller 504 detects features (e.g., eyes, mouth, etc.) of the frame that are to be analyzed further, as described above. The example facial feature determination controller 504 detects features of the frame that are incompatible with the presence of a human face (block 908). For example, the facial feature determination controller 504 identifies areas with hard edges, etc., as described above. The example facial feature determination controller 504 discards the incompatible features (block 910). For example, the facial feature determination controller 504 removes any groups of pixels that were determined to be incompatible with the presence of a human face in an effort to increase the probability and accuracy of identifying audience member(s).

The example facial feature determination controller 504 applies filters to the identified portions of the frame (block 912). For example, the facial feature determination controller 504 convolves filters indicative of a shape, size, and/or distance over the identified portions of the frame to detect lines and features that correspond to the shape of a human face. The example the facial feature determination controller 504 connects the output(s) of the filters to form a fully connected output (block 914).

For example, the facial feature determination controller 504 combines (e.g., concatenates, averages, etc.) the outputs of the filters to form the fully connected output layer. The fully connected output layer is indicative of the human faces detected during the filtering. In this manner, the example audience identifier 508 evaluates the fully connected output (block 916). For example, the audience identifier 508 utilizes the information in the fully connected output to predict and/or otherwise identify audience member(s), as described above.

The example facial features determination controller 504 determines if audience member(s) (e.g., panelist(s)) were identified (block 918). For example, the facial feature determination controller 504 utilizes the evaluation of the fully connected output to determine if audience member(s) were identified. If the example facial feature determination controller 504 determines human size heat blobs were not detected (e.g., block 918=NO), then the example facial feature determination controller 504 prompts the scanning controller 506 to scan the media environment (block 920). For example, the facial feature determination controller 504 may send a trigger to the scanning controller 506 to prompt the scanning controller 506 to capture more frames of audience image data of the media presentation environment 104.

If the example facial feature determination controller 504 determines audience member(s) (e.g., panelist(s)) were identified (e.g., block 918=YES), then the example facial feature determination controller 504 provides the audience identification to controller(s) (block 922). For example, the facial feature determination controller 504 provides the audience identification to the people meter controller 302 (FIG. 3) and/or the people identification model controller 310 (FIG. 3). The example audience member identification program 806 ends when the audience identifier 508 updates the counter value to equal the number of human size heat blobs detected in the image frame. The example heat blob determination program 706 repeats when the example heat blob determination controller 404 obtains a new frame of thermal image data from the example thermal image database 402.

FIG. 10 illustrates an example training program 1000 to train a people identification model to predict a verified audience composition for subsequent dates and times in the media presentation environment 104. The example machine readable instructions 1000 may be used to implement the example people identification model controller 310 of FIG. 3. In FIG. 10, the example training program 1000 beings at block 1002, when the example feature extractor 604 (FIG. 6) obtains comparison data from the example comparator 308 (FIG. 3) and audience image data from the example audience image detector 307 (FIG. 3). For example, the comparator 308 provides comparison results and time stamps to the example feature extractor 604. Additionally or alternatively, the audience image detector 307 provides audience identification data and time stamps to the example feature extractor 604.

The example feature extractor 604 obtains data from the example people meter controller 302 (FIG. 3) (block 1004). For example, the people meter controller 302 provides demographic data corresponding to the logged in panelist members at a time they logged in. The example feature extractor 604 obtains evaluation data from the example thermal image detector 306 (FIG. 3) (block 1006). For example, the thermal image detector 306 provides the analysis and evaluation results of the frame of thermal image data for a particular time. Additionally, the example thermal image detector 306 provides the tagged frame (e.g., the frame tagged with a blob count by the blob counter 408 (FIG. 4)) to the example feature extractor 604.

The example feature extractor 604 obtains evaluation data from the example audience image detector 307 (FIG. 3) (block 1008). For example, the audience image detector 307 provides the analysis and evaluation results of the frame of audience image data for a particular time. Additionally, the example audience image detector 307 provides the tagged frame (e.g., the frame tagged with audience identifier(s) by the audience identifier 508 (FIG. 5)) to the example feature extractor 604.

The example feature extractor 604 obtains media identifying information from the example media measurement data controller 212 (FIG. 2) (block 1010). For example, the media measurement data controller 212 provides media identifying information to the communication controller 602 (FIG. 6) in response to receiving a people count and/or audience identifier(s), and the communication controller 602 provides the media identifying information to the feature extractor 604.

The example feature extractor 604 extracts features of the people monitoring information (block 1012). As used herein, the people monitoring information corresponds to the information and data obtained from the example people meter controller 302, the example comparator 308, the example thermal image detector 306, the example audience image detector 307, and the example media measurement data controller 212. This data can be used to determine a verified audience composition and/or represents a verified audience composition.

The example feature extractor 604 generates a feature vector corresponding to the extracted features of the people monitoring data (block 1014). For example, the feature extractor 604 generates a feature vector that represents descriptive characteristics of a physical environment (e.g., the media presentation environment) at particular dates and times, or at a particular date and time. The example feature extractor 604 determines if there are additional people monitoring data (block 1016). For example, the feature extractor 604 determines if another set of people monitoring data, representative of the people count during a different time in the media presentation environment 104, is available. If the example feature extractor 604 determines there are additional people monitoring data (block 1016=YES), then control returns to block 1002. In such an example, the model trainer 606 (FIG. 5) needs to receive people monitoring data of the media presentation environment 104 that is sufficient to generate a sufficiently accurate and/or precise model.

If the example feature extractor 604 determines there are not additional people monitoring data (block 1016=NO), then the example model trainer 606 trains the people identification model based on the feature vector (block 1018). For example, the model trainer 606 may utilize a machine learning technique to predict output probability values corresponding to the number of people and/or which audience members are in the media presentation environment 104. The output probability values could correspond to future predictions of the audience member(s) viewing particular media in the media presentation environment 104 or the output probability values could correspond to future predictions of the audience member(s) in the media presentation environment 104 at a particular hour of the day or day of the week.

After the people identification model has been trained, the example model updater 608 flags the people identification model as new or updated. Further, the example model generator 610 generates the trained model (block 1020). For example, the model generator 610 receives the new and/or updated trained people identification model from the model updater 608 and generates a file to store/save the trained people identification model for subsequent access by the people meter controller 302 (FIG. 3), the thermal image detector 306 (FIG. 3), and/or the audience image detector 307 (FIG. 3).

The example model generator 610 stores the trained people identification model in the example model database 312 (FIG. 3) (block 1022). The training program 1000 ends when the trained people identification model is stored in the example model database 312. The training program 1000 repeats when the example feature extractor 604 obtains people monitoring data.

In some examples, the trained people identification model is published by the people identification model controller 310. When the people identification model is published, the people identification model operates in a detection phase, where the example people identification model controller 310 utilizes the trained model, in real time, to determine an accurate audience composition of the media presentation environment 104. In some examples, the people identification model replaces the people meter controller 302, the thermal image detector 306, the audience image detector 307, and the comparator 308. In such an example, the people identification model obtains input data from the thermal imaging sensor 124 and/or the light imaging sensor 125 to determine an accurate audience composition of the media presentation environment 104. Such input from the thermal imaging sensor 124 includes frames of thermal image data. Such input from the light imaging sensor 125 includes frames of audience image data. For example, the people identification model utilizes its prediction capabilities in connection with information obtained about the media presentation environment 104 to output an accurate representation of the number and/or identification of people in the media presentation environment 104. In such an example, the people meter controller 302 no longer requires audience input, and thus compliance becomes less of an issue when determining an accurate audience composition.

Figure 11:
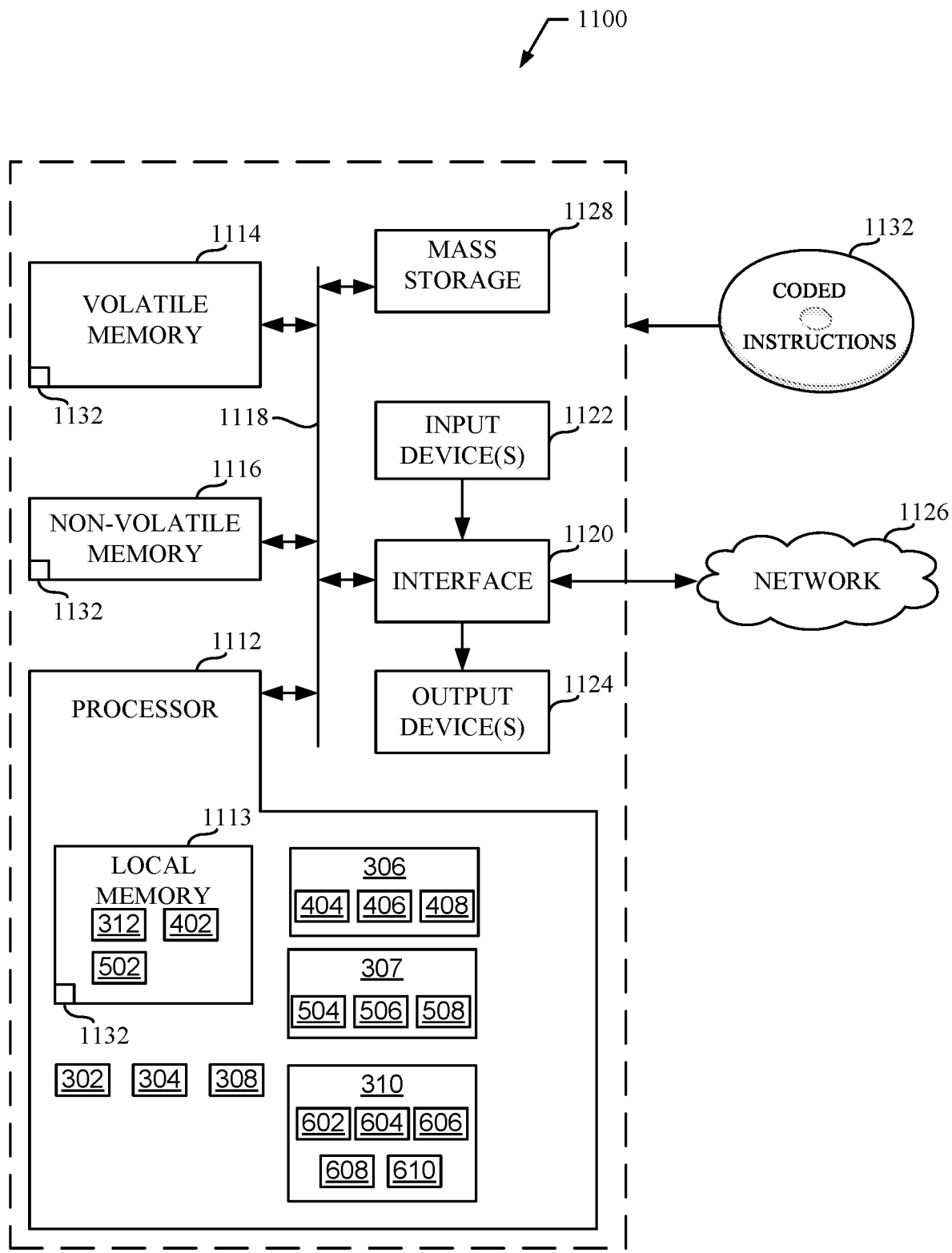
FIG. 11 illustrates a block diagram of an example processing platform structured to execute the instructions of one or more of FIGS. 7-10 to implement the example people meter of FIGS. 2-6.

FIG. 11 is a block diagram of an example processor platform 1100 structured to execute the instructions of FIGS. 7-10 to implement the people meter 210 of FIGS. 2-6. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example people meter controller 302, the example interface 304, the example thermal image detector 306, the example audience image detector 307, the example comparator 308, the example people identification model controller 310, the example model database 312, the example thermal image database 402, the example heat blob determination controller 404, the example scanning controller 406, the example blob counter 408, the example audience image database 502, the example facial feature determination controller 504, the example scanning controller 506, the example audience identifier 508, the example communication controller 602, the example feature extractor 604, the example model trainer 606, the example model updater 608, and the example model generator 610.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIGS. 7-10 may be stored in the mass storage device 1128, in the volatile memory 1114, in the non-volatile memory 1116, and/or on a removable non-transitory computer readable storage medium such as a CD or DVD.

From the foregoing, it will be appreciated that example methods, apparatus and articles of manufacture have been disclosed that determine an audience composition in a media presentation environment by capturing frames of thermal image data and/or audience image data and comparing an evaluation of the frames to audience input data. The disclosed example methods, apparatus and articles of manufacture improve the efficiency of using a computing device by using the audience input data and the evaluation of the frames to train a people identification model to determine the audience composition. The people identification model, once trained, can replace the people meter and thus, improve the efficiency processing time by eliminating a need for audience input data. The disclosed example methods, apparatus and articles of manufacture improve the efficiency of using a computing device by reducing prompting messages when the faces identified in the frames of audience image data match the logged reference frames of audience member images. The disclosed methods, apparatus and articles of manufacture are accordingly directed to one or more improvement(s) in the functioning of a computer.

Example methods, apparatus, systems, and articles of manufacture to determine an audience composition in a media environment are disclosed herein. Further examples and combinations thereof include the following:

Example 1 includes an apparatus to measure an audience in a media environment, the apparatus comprising a thermal image detector to determine a heat blob count based on a frame of thermal image data captured in the media environment, an audience image detector to identify a face of an audience member based on a frame of audience image data captured in the media environment, the frame of audience image data corresponding to a field of view associated with at least one heat blob included in the heat blob count, and a people meter controller to cause a people meter, which is to emit a prompt for audience identification information, not to emit the prompt for at least a first time period after the audience member is identified.

Example 2 includes the apparatus of example 1, wherein the image detector is to identify the face of the audience member based on one or more facial features, the one or more facial features including at least one of an eye, a mouth, or a nose.

Example 3 includes the apparatus of example 1, further including a scanning controller to collect the frame of audience image data in response to a change in the heat blob count.

Example 4 includes the apparatus of example 3, wherein the image detector is to identify one or more audience members based on a comparison of the frame of audience image data and a library of reference audience member images, the comparison performed in response to the change in the heat blob count.

Example 5 includes the apparatus of example 4, wherein the people meter controller is to send a reset notification to a counter in response to the identification of the audience member based on the frame of audience image data, the people meter to emit the prompt when the counter expires.

Example 6 includes the apparatus of example 1, wherein the people meter controller is to cause the people meter to emit the prompt in response to no audience members being identified in the frame of audience image data.

Example 7 includes the apparatus of example 1, further including a light imaging sensor to capture the frame of audience image data based on the field of view.

Example 8 includes a non-transitory computer readable storage medium comprising instructions that, when executed, cause one or more processors to at least determine a heat blob count based on a frame of thermal image data captured in a media environment, identify a face of an audience member based on a frame of audience image data captured in the media environment, the frame of audience image data corresponding to a field of view associated with at least one heat blob included in the heat blob count, and not to emit a prompt for audience identification information for at least a first time period after the audience member is identified.

Example 9 includes the non-transitory computer readable storage medium of example 8, wherein the instructions, when executed, cause the one or more processors to identify the face of the audience member based on one or more facial features, the one or more facial features including at least one of an eye, a mouth, or a nose.

Example 10 includes the non-transitory computer readable storage medium of example 8, wherein the instructions, when executed, cause the one or more processors to collect the frame of audience image data in response to a change in the heat blob count.

Example 11 includes the non-transitory computer readable storage medium of example 10, wherein the instructions, when executed, cause the one or more processors to identify one or more audience members based on a comparison of the frame of audience image data and a library of reference audience member images, the comparison performed in response to the change in the heat blob count.

Example 12 includes the non-transitory computer readable storage medium of example 11, wherein the instructions, when executed, cause the one or more processors to send a reset notification to a counter in response to the identification of the audience member based on the frame of audience image data, and emit the prompt when the counter expires.

Example 13 includes the non-transitory computer readable storage medium of example 8, wherein the instructions, when executed, cause the one or more processors to emit the prompt in response no audience members being identified in the frame of audience image data.

Example 14 includes the non-transitory computer readable storage medium of example 8, wherein the instructions, when executed, cause the one or more processors to capture the frame of audience image data based on the field of view.

Example 15 includes a method to measure an audience in a media environment, the method comprising determining a heat blob count based on a frame of thermal image data captured in the media environment, identifying a face of an audience member based on a frame of audience image data captured in the media environment, the frame of audience image data corresponding to a field of view associated with at least one heat blob included in the heat blob count, and not emitting a prompt for audience identification information for at least a first time period after the audience member is identified.

Example 16 includes the method of example 15, further including collecting the frame of audience image data in response to a change in the heat blob count.

Example 17 includes the method of example 16, further including identifying one or more audience members based on a comparison of the frame of audience image data and a library of reference audience member images, the comparison performed in response to the change in the heat blob count.

Example 18 includes the method of example 17, further including sending a reset notification to a counter in response to the identification of the audience member based on the frame of audience image data, and emitting the prompt when the counter expires.

Example 19 includes the method of example 15, further including emitting the prompt in response to no audience members being identified in the frame of audience image data.

Example 20 includes the method of example 15, further including capturing the frame of audience image data based on the field of view.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to measure an audience in a media environment, the apparatus comprising:
   a thermal image detector;
   a visible light camera;
   a people meter interface; and
   a control system to:
      identify, based on a frame of thermal image data captured in the media environment by the thermal image detector, at least one heat blob in the media environment;
      cause a field of view of the visible light camera to be focused to correspond to a location of the at least one heat blob in the media environment;
      obtain a frame of audience image data of the focused field of view captured by the visible light camera;
      identify a face of an audience member based on the frame of audience image data; and
      forgo prompting for audience identification information via the people meter interface for a first time period immediately after identifying the face of the audience member.

2. The apparatus of claim 1, wherein the control system is to identify the face of the audience member based on one or more facial features, the one or more facial features including at least one of an eye, a mouth, or a nose.

3. The apparatus of claim 1, wherein the control system is further to determine a heat blob count based on the at least one heat blob, and to collect the frame of audience image data in response to a change in the heat blob count.

4. The apparatus of claim 3, wherein the control system is to identify one or more audience members based on a comparison of the frame of audience image data and a library of reference audience member images, the comparison performed in response to the change in the heat blob count.

5. The apparatus of claim 1, wherein the control system is to send a reset notification to a countdown timer in response to the identification of the face of the audience member, wherein resetting the countdown timer causes the countdown timer to countdown the first time period, and wherein the control system is to initiate a prompt for audience identification information via the people meter interface when the countdown timer expires.

6. The apparatus of claim 1, wherein the control system is to cause the people meter to initiate a prompt for audience identification information via the people meter interface in response to no audience members being identified in a subsequent frame of audience image data.

7. The apparatus of claim 1, wherein the visible light camera has a default field of view of the media environment that overlaps with a thermal field of view of the thermal image detector, and wherein the focused field of view corresponding to the at least one heat blob is a subset of the default field of view.

8. A non-transitory computer readable storage medium comprising instructions that, when executed by at least one processor of a computing system, cause the computing system to at least:
   identify, based on a frame of thermal image data captured in a media environment, at least one heat blob in the media environment;
   cause a field of view of a visible light camera to be focused to correspond to a location of the at least one heat blob in the media environment;
   obtain a frame of audience image data of the focused field of view captured by the visible light camera;
   identify a face of an audience member based on the frame of audience image data; and
   forgo prompting for audience identification information for a first time period immediately after identifying the face of the audience member is identified.

9. The non-transitory computer readable storage medium of claim 8, wherein the instructions, when executed by at least one processor, cause the computing system to identify the face of the audience member based on one or more facial features, the one or more facial features including at least one of an eye, a mouth, or a nose.

10. The non-transitory computer readable storage medium of claim 8, wherein the instructions, when executed by at least one processor, cause the computing system to determine a heat blob count based on the at least one heat blob, and to collect the frame of audience image data in response to a change in the heat blob count.

11. The non-transitory computer readable storage medium of claim 10, wherein the instructions, when executed by at least one processor, cause the computing system to identify one or more audience members based on a comparison of the frame of audience image data and a library of reference audience member images, the comparison performed in response to the change in the heat blob count.

12. The non-transitory computer readable storage medium of claim 8, wherein the instructions, when executed by at least one processor, cause the computing system to:
   send a reset notification to a countdown timer in response to the identification of the face of the audience member, wherein resetting the countdown timer causes the countdown timer to countdown the first time period; and initiate a prompt for audience identification information when the countdown timer expires.

13. The non-transitory computer readable storage medium of claim 8, wherein the instructions, when executed by at least one processor, cause the computing system to initiate a prompt for audience identification information in response no audience members being identified in a subsequent frame of audience image data.

14. The non-transitory computer readable storage medium of claim 8, wherein the visible light camera has a default field of view of the media environment that overlaps with a thermal field of view of a thermal image detector, and wherein the focused field of view corresponding to the at least one heat blob is a subset of the default field of view.

15. A method to measure an audience in a media environment, the method comprising:

identifying, based on a frame of thermal image data captured in the media environment, at least one heat blob in the media environment;

causing a field of view of a visible light camera to be focused to correspond to a location of the at least one heat blob in the media environment;

obtaining a frame of audience image data of the focused field of view captured by the visible light camera;

identifying a face of an audience member based on the frame of audience image data; and forgoing prompting for audience identification information for a first time period immediately after the identifying the face of the audience member.

16. The method of claim 15, further including determining a heat blob count based on the least one heat blob, and collecting the frame of audience image data in response to a change in the heat blob count.

17. The method of claim 16, further including identifying one or more audience members based on a comparison of the frame of audience image data and a library of reference audience member images, the comparison performed in response to the change in the heat blob count.

18. The method of claim 15, further including:

sending a reset notification to a countdown timer in response to the identification of the audience member, wherein resetting the countdown timer causes the countdown timer to countdown the first time period; and initiating a prompt for audience identification information when the countdown timer expires.

19. The method of claim 15, further including initiating a prompt for audience identification information in response to no audience members being identified in a subsequent frame of audience image data.

20. The method of claim 15, wherein the visible light camera has a default field of view of the media environment that overlaps with a thermal field of view of a thermal image detector, and wherein the focused field of view corresponding to the at least one heat blob is a subset of the default field of view.

* * * * *